United States Patent
Nayak

(10) Patent No.: US 7,590,645 B2
(45) Date of Patent: Sep. 15, 2009

(54) PERFORMANT AND SCALABLE MERGE STRATEGY FOR TEXT INDEXING

(75) Inventor: Tapas K. Nayak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 76 days.

(21) Appl. No.: 11/224,579

(22) Filed: Sep. 12, 2005

(65) Prior Publication Data

US 2006/0010146 A1 Jan. 12, 2006

Related U.S. Application Data

(63) Continuation of application No. 10/164,052, filed on Jun. 5, 2002, now Pat. No. 7,016,914.

(51) Int. Cl.
*G06F 17/00* (2006.01)
*G06F 17/30* (2006.01)

(52) U.S. Cl. ............................... 707/101; 707/4

(58) Field of Classification Search ........................ None
See application file for complete search history.

(56) References Cited

U.S. PATENT DOCUMENTS 5,685,003 A * 11/1997 Peltonen et al. ............. 715/202
6,189,011 B1 * 2/2001 Lim et al. .................... 707/102
6,360,215 B1   3/2002 Judd et al. ...................... 707/3
6,638,314 B1   10/2003 Meyerzon et al. ........... 715/513
7,007,015 B1 * 2/2006 Nayak ............................ 707/4
2002/0073115 A1 6/2002 Davis ........................ 707/500.1
2003/0004949 A1 1/2003 Hong et al. .................... 707/10
2003/0028896 A1 2/2003 Swart et al. .................. 725/127

OTHER PUBLICATIONS

Golovchinsky, G., "What the query told the link: The integration of hypertext and information retrieval," *Hypertext 97*, Southampton, UK, 1997, 67-74.
Jennings, R., "SQL server 2000 has the potential to threaten oracle's database dominance. Learn why this in-depth analysis," *SQL Server in the Enterprise*, Fall 2000, 20-29.

* cited by examiner

*Primary Examiner*—Tony Mahmoudi
*Assistant Examiner*—Jacob F Betit
(74) *Attorney, Agent, or Firm*—Woodcock Washburn LLP

(57) ABSTRACT

A full-text search index system and method is generated by creating instances of a database index from an in-memory inverted list of keywords associated with a text identifier and the occurrences of the keyword in the text. Instances of the index are placed in a priority queue. A merge scheduling process determines when a merge should be initiated, selects instances of the index to be merged and selects a type of merge to perform. Instances of an index are assigned a temporal indicator (timestamp). A set of instances is selected to be merged. The set of instances is validated and merged.

19 Claims, 21 Drawing Sheets

Ft Index

| |
|---|
| Keyword  802 |
| PropertyId  804 |
| DocIdList  806 |
| DocCount  808 |
| DocIDMin  810 |
| DocIdMax  812 |
| OCCListList  814 |
| OCCCountList  816 |

1802
IndexId 1

| | Keyword1 | DocIdList 2 | OccListList 3 |
|---|---|---|---|
| 1 | Innovation | 1, 2 | 100, 1513, 1617/200, 205, 375 |
| 2 | Significant | 1, 2 | 105, 200, 1514, 1700/204, 300, 362 |

1804
IndexId 2

| | Keyword1 | DocIdList 2 | OccListList 3 |
|---|---|---|---|
| 1 | Knowledge | 3 | 5 |

1806
IndexId 3

| | Keyword1 | DocIdList 2 | OccListList 3 |
|---|---|---|---|
| 1 | Innovation | 1 | 105, 1518, 1629 |
| 2 | Power | 4 | 10, 21 |

1808
IndexId 4

| | Keyword 1 | DocIdList 2 | OccListList 3 |
|---|---|---|---|
| | Summit | 5 | 10 |

1810
MergeIndex M

| | Keyword 1 | DocIdList 2 | OccListList 3 |
|---|---|---|---|
| 1 | Innovation | 1, 2 | 105, 1518, 1629/200, 205, 375 |
| 2 | Knowledge | 3 | 5 |
| 3 | Power | 4 | 10, 21 |
| 4 | Significant | 1, 2 | 105, 200, 1514, 1700/204, 300, 362 |
| 5 | Summit | 5 | 10 |

Figure 18

PERFORMANT AND SCALABLE MERGE STRATEGY FOR TEXT INDEXING

REFERENCE TO RELATED APPLICATIONS

This application is a continuation application and claims priority to U.S. patent application Ser. No. 10/164,052, filed Jun. 5, 2002, entitled "Performant and Scalable Merge Strategy for Text Indexing", which is incorporated herein by reference in its entirety.

FIELD OF THE INVENTION

This invention relates generally to the field of computing and in particular to full-text indexing in a database environment.

BACKGROUND

Full-text searching of unstructured and semi-structured data is becoming more and more important in the world of computing. For many years, the information-retrieval community has had to deal with the storage of documents and with the retrieval of documents based on one or more keywords. Since the burgeoning of the World Wide Web, and the feasibility of storing documents on-line, retrieval of documents based on keywords has become a thorny problem. A number of software solutions have been developed, which have attempted to address some of these problems.

A large portion of digitally stored information is presently stored in the form of unstructured textual data, both in plain text files and in formatted documents. Although the bulk of this textual data is stored in file systems, there are advantages to storing such data in relational databases. By doing so, the advantages of a database, including high-performance access, query capability, simple application-based user interfaces for end users, and secure remote access, are made available.

Relational Databases

Database management systems (DBMSs) such as SQL Server are widely used to search structured data. It is impractical, however, to search unstructured data (e.g., text documents) the same way structured data is searched because doing so is too expensive.

For example, in order to retrieve information from structured data in a database, a user typically provides a query (written in a query language such as SQL), where the query specifies the structured information to be retrieved (the search term or terms), the field in which the search term is to be found and the manner in which the retrieved information is to be manipulated or evaluated in order to provide a useful result, which is typically a relational operator or a function. To process the query, the database system typically converts the query into a relational expression that describes algebraically the result specified by the query. The relational expression is used to produce an execution plan, which describes particular steps to be taken by a computer to produce the requested result. Because the search term and the field where the search term is sought are specified, such results can be returned quickly. Indexes based on key fields, (e.g., an index based on name or social security number for a personnel database), routinely assist in efficient searching.

A similarly-conducted search for the same search term in unstructured data would require a word-by-word search of the entire text database and is unworkable.

Typically, today, an inverted index for searching documents is created by building a custom data structure external to the database system before a search query is entered. These solutions usually involve pulling data out of the database via bridges or gateways and storing the data as files in the file system so that textual indexing can be applied. Some systems actually store index data in a database but use an external engine to build and query the index. This approach does not provide a seamless way for a user to combine a textual query with a regular structured relational query and limits the extent to which a query can be optimized.

Typically, a full-text index is organized as a tree where internal nodes represent keywords and whose external nodes contain document identifiers and occurrences. When searched, the keyword(s) are looked up in the index and the documents containing the keyword(s) are retrieved. Naturally, whenever the collection of documents changes, a new index must be built or the existing index must be updated.

Although full text searching is frequently a capability of database management systems, the implementation of full-text search is typically unable to take advantage of the features of the database management system, which is to say, relational database management systems generally are unable to accommodate full-text searching of documents within the structure of the database. Typically, the index created to search the document database is not itself part of the database system (i.e., is separate from the database's index system). Because the index created is not part of the database system, certain limitations arise and certain highly advantageous aspects of database systems do not apply to typical full-text search systems.

Limitations associated with a full-text search system that relies on an external index include the following:

Integration with existing database search technologies like Microsoft's SQL SERVER is fairly complex and difficult because the index is a custom index, and typically has its own transactional mechanism and storage mechanism. A significant amount of custom code, therefore, is needed for indexing, querying and administration.

Enhancements to existing or newly added systems that require a change in persistent storage format is difficult because changes in the storage management code of the custom index is required.

Implementation of scaling features such as the distribution of workload and files among multiple resources including clustering, etc., requires a significant amount of development.

Replication, i.e., keeping distributed databases synchronized by copying the entire database or subsets of the database to other servers in the network, is typically of the unsophisticated "full copy and propagate" form with very loose integrity semantics. A more efficient form of replication would require a significant amount of development.

Incorporation of database features such as query caching, keyword buffering, data partitioning etc. is more difficult since any such work frequently impacts the core engine code and sometimes impacts persistent store layout.

Upgrading from one file structure to another is a difficult development task.

A significant amount of code must be maintained to perform a function which is very similar to a function already performed by, for example, a cluster index associated with a relational database system such as SQL Server.

Query optimization cannot be tightly integrated.

Similarly, some of the advantages of database management systems are not applicable to a full-text search system based on a custom index. For example, most database systems have excellent facilities for data recovery in the event of database degradation, however, these data recovery systems do not work for the index file because the index file is not a DBMS data store. Hence data corruption can be a frequent problem with a file system index file. If there is a hardware malfunction it is very difficult to efficiently reach a point where the documents database and the documents index are in sync because the two different systems have different recovery protocols.

Backup and restore mechanisms for the index file generally do not have the advanced features typically available for database files, as discussed above.

Scalability issues exist for the index file. Scalability refers to partitioning one logical table into multiple physical tables on the same machine or on different machines in order to accommodate very large collections of data. For example, instead of storing a large database on a single resource, it is frequently desirable to split or partition the database across a number of resources. Database data stores generally maintain data in tables that can reside locally on a single data store or can be distributed among several data stores in a distributed database environment.

Advantages to partitioning are the reduction of processing load on a single resource, faster access to data and if a particular machine experiences a hardware failure, only part of the data is lost. Partitioning, however, is typically not available for a file system index file, because partitioning a file system file requires a separate infrastructure. Thus, typically the index file, although frequently very large, cannot be partitioned, so a single resource must be dedicated to the index.

Hence, a need exists in the art to provide a full-text searching system wherein the index is built upon standard database technology.

Most of the methods of building text indexes based on keyword, document identifier and occurrence lists share the mechanism of building compressed inverted lists and merging the inverted lists to build merged indexes. For example, when a database is searched, data is typically scanned and then indexed. Each time a crawler finishes crawling a batch of data, an indexer may build an inverted list of keywords with data identifiers and the occurrences of the keyword(s) in the data (an index). Typically the index is persisted. Frequently several (or many) indexes are built per data set because typically the body of data is quite large. Indexes are then merged together. During the merge of an old index into a new index, typically a table lookup must be done for every data identifier in the older index to see if the data has been changed or deleted since the older index was built. For example, if a particular data item was present in the older index but is deleted or changed later, the information about the data from the old index is not included in the new index. Typically, for performance reasons, this table is stored in memory. It would be helpful if the number of table lookups could be reduced, especially if the need for an in-memory data structure for the lookup table could be reduced or eliminated.

SUMMARY OF THE INVENTION

A full-text indexing system and method is built using standard database technology, (e.g., the Microsoft SQL SERVER storage and query engine). An inverted list is generated comprising keywords contained in data, (e.g., text), an identifier associated with the data and the occurrence(s) of the keyword in the list. An instance of a database index (part of the DBMS indexing system) is created and stored in a priority queue. A scheduling process determines when instances of the index are to be merged. Instances are prioritized by number of rows (keywords) and size. One of three types of merges is selected and the instances are merged.

A crawl associated with a temporal indicator, (called herein a "timestamp" and equivalently represented by the variable TS), crawls through (scans) data. Data that has been crawled is also associated with the crawl timestamp. A crawl timestamp is assigned to a crawl at the start of the crawl. A table, (called herein "DocIdMap"), maps a full-text data item identifier to a numeric identifier. The numeric identifier of the data item is also preferably associated with the crawl timestamp of the crawl that scanned the data.

A plurality of indexes may be generated by one crawl. Each of the indexes generated by a crawl receives the timestamp of the crawl that generated it so that all of the indexes generated by the same crawl will have the same timestamp. Indexes generated by a subsequent crawl will have a timestamp that is greater (or recognizable as later-occurring) than that of the earlier crawl. A crawl is associated with a timestamp based on the start time of the crawl so that crawls and their resulting indexes are ordered temporally.

A set of indexes to be merged is selected. Validity of the set of indexes is determined. Merge transactions merge a set of validated indexes into one comprehensive index. The merge process scans a set of indexes in order of keywords and for each keyword from each index, scans the numeric identifiers in the associated list of numeric identifiers. If a numeric identifier qualifies for the new index the numeric identifier and its associated occurrences are put into the new index. If a numeric identifier does not qualify for the new index, the numeric identifier and its associated occurrence list is skipped and the next numeric identifier is considered.

Whether or not a numeric identifier of a particular index qualifies for the new index is determined by comparing the timestamp of the index with the maximum timestamp of the set of indexes to be merged and the timestamp of the identifier. A lookup into the DocidMap table is only required when a data item is deleted or when a timestamp for the numeric identifier is less than the maximum timestamp of the indexes to be merged. This reduces the need for table lookups and in some cases eliminates the lookup completely. Because the need for table lookups is significantly reduced, all of the table does not have to be resident in memory all the time. As a special case, in case of a full crawl, there is no need for a lookup of the mapping table.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 18 is a block diagram of exemplary indexes to be merged and a merged index in accordance with one embodiment of the invention;

DETAILED DESCRIPTION OF THE INVENTION

Exemplary Computing Environment

Figure 1:
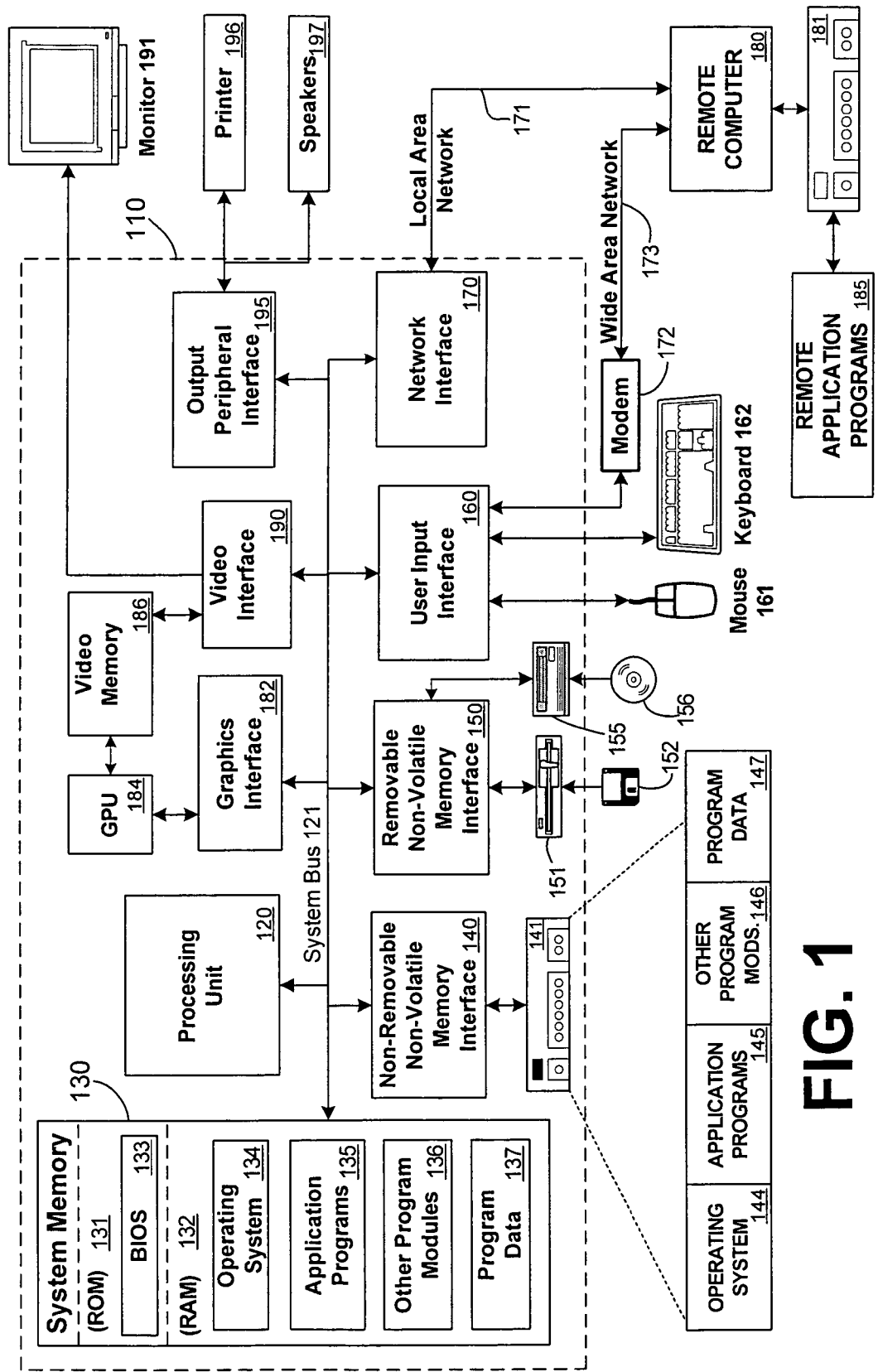
FIG. 1 is a block diagram of an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Full-Text Indexing System

Figure 2:
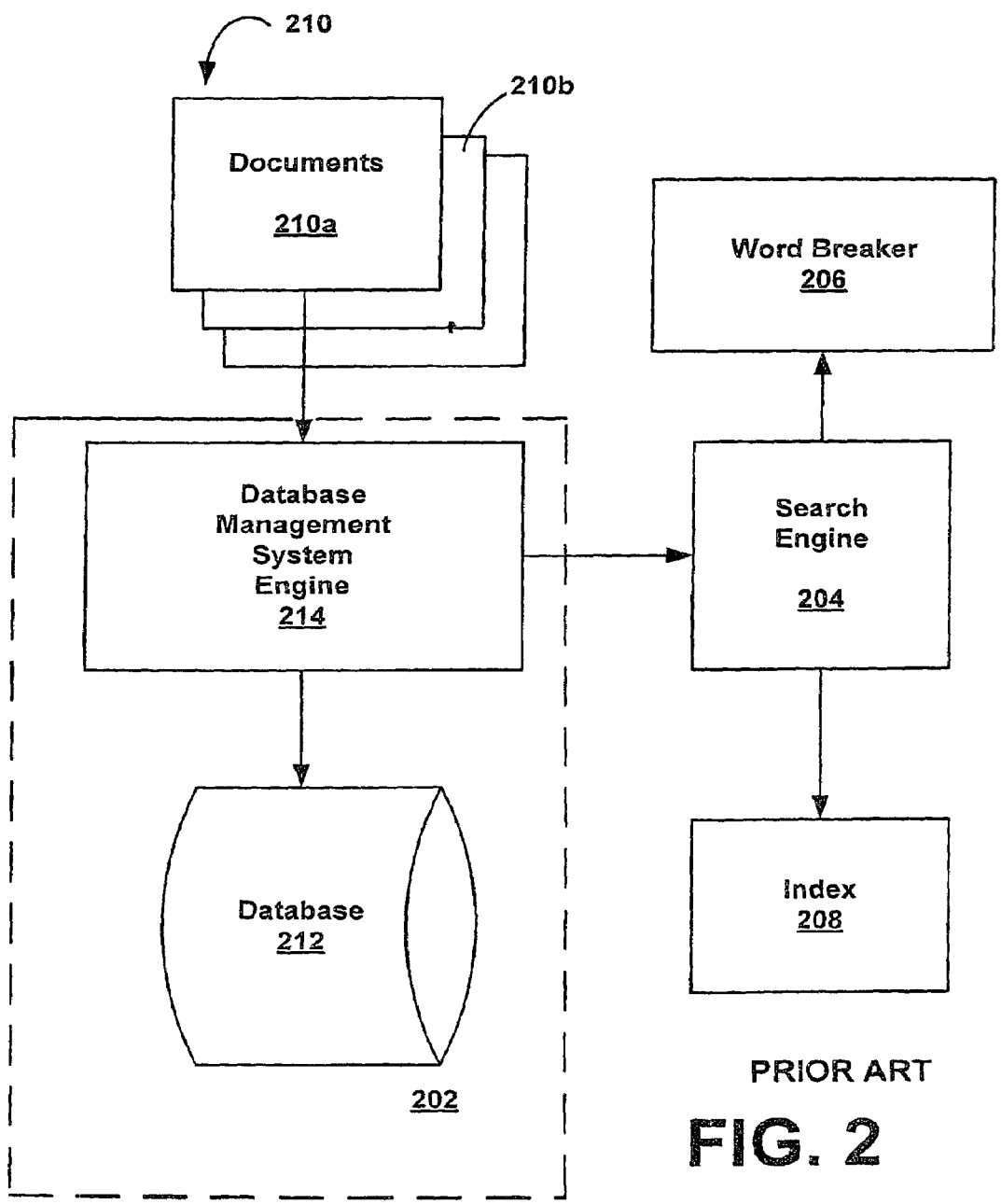
FIG. 2 is a block diagram of a full-text search indexing system as is known in the art.

Full-text search indexing systems utilizing an external index may be implemented as shown in FIG. 2. Typically a group of documents 210 includes individual documents 210a, 210b, etc., one or more of which may be loaded into a database basetable of a DBMS 202. In general, a document 210a is loaded into the columns of a row in the basetable, one document per column. The database system 202, including database management system engine 214 and data stores (databases) 212, typically associates document 210a with a unique document identifier (called herein full-text key) which is used to identify the row in the basetable that contains the document. The text of document 210a is provided to word breaker 206 by search engine 204. Word breaker 206 determines which words of the text of document 210a should be keywords (also known as tokens). Word breaker 206 also determines the location(s) of the keyword in the document, as a number representing byte offset from the beginning of the document. In other words, if word breaker 206 determines that a key word of document 210a is "innovation" and the word "innovation" is the first, fourteenth and twenty-fifth word in document 210a, the word breaker 206 would typically return the keyword "innovation" and the byte offsets at which the first, fourteenth and twenty-fifth words are located, to search engine 204. An index 208 of tokens or keywords is generated by an external executable such as a search engine 204. For each keyword associated with the text of document 210a, an entry in index 208 would be created, typically containing the keyword and the occurrences of the keyword in document 210a for each keyword in document 210a.

Figure 3:
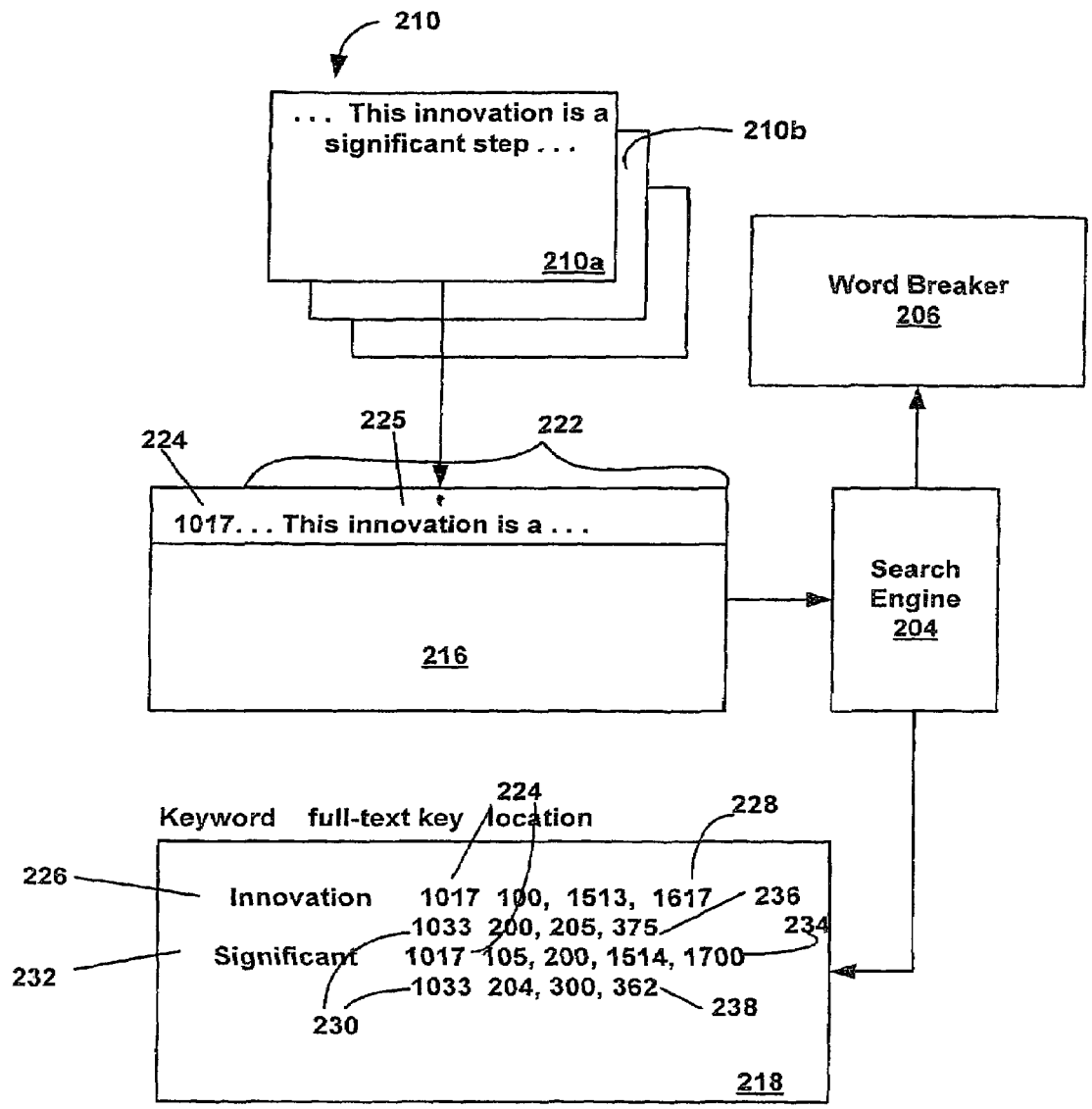
FIG. 3 is a block diagram of a portion of the full-text search indexing system of FIG. 2, as is known in the art.

For example, and referring now to FIG. 3, suppose a document 210a of a collection of documents 210, including document 210a, 210b, etc., is loaded into a database basetable 216. Document 210a is assigned a full-text key by the database management system 202. For example, database management system 202 may assign document 210a the full-text key "1017" 224. The full-text key assigned by the database management system 202 typically is alphanumeric and can be rather large. Assume document 210a full-text key 1017 224 contains the text "This innovation is a significant step towards search and indexing technology." 225 somewhere within the document. When full-text key 1017 224 is loaded into basetable 216, "This innovation is a significant step towards search and indexing technology" is loaded into basetable 216 of database management system 202. The words "This innovation is a significant step towards search and indexing technology", for example, might be loaded into word locations 99 through 110 of a row in the content field 222 of basetable 216.

External search engine 204 may retrieve data associated with full-text key 1017 224 from basetable 216 and send this data to word breaker 206. Typically a word beaker 206 would be invoked to pick out the keywords or tokens from the text of document 210a. In the example, word breaker 206 has determined that the keywords contained in document 210a include "innovation" and "significant". Word breaker 206 also typically determines the byte offset from the beginning of the document at which the keywords (also referred to as "tokens") are found. For example, word breaker 206 may determine that "innovation" can be found in document 210a at byte offsets 1000, 12104 and 16170, and that "significant" can be found in document 210a at byte offsets 1050, 1600, 15138 and 17010. This information may be passed back to search engine 204.

Search engine 204 typically uses this information to create index 218 and may convert byte offset to word offset. In the example described above, index 218 would contain keyword "innovation" 226 followed by full-text key 1017 224 followed by the locations (word offset) 228 at which "innovation" can be found in the document, (i.e., 100, 1513, 1617). Suppose another document 210b (assigned a full-text key of "1033") also contains the word "innovation" at word locations 200, 205 and 375. The index 218 in this case would contain an entry for full-text key 1033 230 followed by the locations 236 at which "innovation" can be found (i.e., 200, 205, 375) in full-text key 1033. Similar entries 234, 238 for keyword "significant" would also be generated for full-text key 1017 and full-text key 1033 (234, 238). Thus a file system index typically is created containing keywords, full-text keys for documents containing each keyword and the locations within each document containing the keyword specifying the location by word offset of the keyword in that document.

A user querying the database might ask, for example, for all the documents containing the words "innovation" located near the word "significant". Depending on the specific query form, a table of results might be returned, listing the document numbers containing the words "innovation" located near "significant". Additionally, a "rank" for each document is also typically returned, where the rank is based on some proprietary formula, (such as, ranked by number of times the word(s) appeared in the document, whether the requested word(s) appeared in the title of the document, etc.). Rank typically reflects the relevance of the document to the search query.

Index 218 is typically a structure built on the file system and is not a database file and therefore is subject to the limitations in recoverability, reliability, management and scalability described above.

Full-Text Indexing on Relational Store

Figure 4:
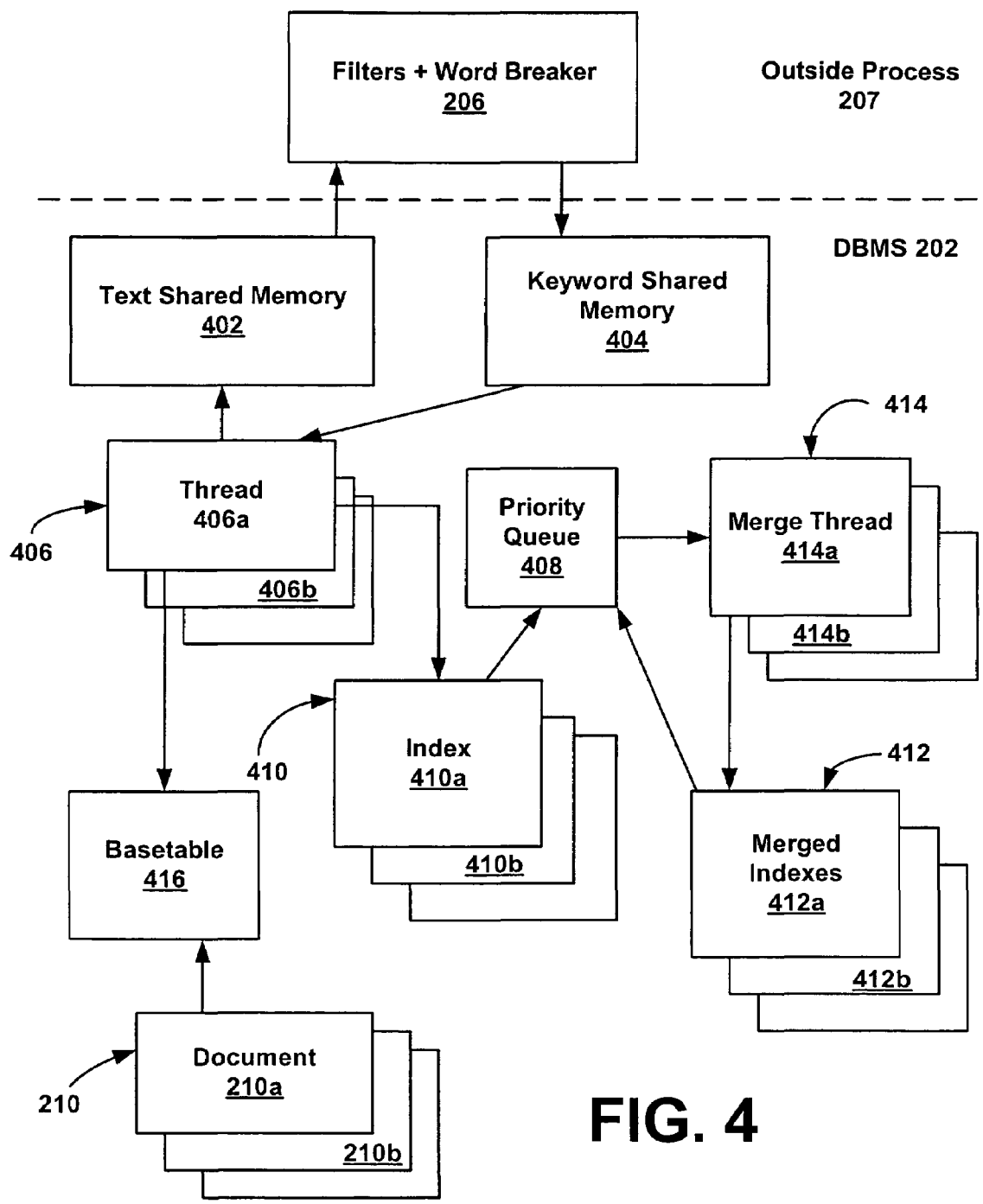
FIG. 4 is a block diagram of a full-text search indexing system in accordance with one embodiment of the invention.

FIG. 4 illustrates a full-text indexing system built on a relational store in accordance with one embodiment of the invention. Referring now to FIG. 4, document set 210, comprising a plurality of documents 210a, 210b, etc. is loaded into basetable 416 of DBMS 202. Alternatively, the document set 210 may exist as file system files. Thread pool 406 preferably contains a plurality of processing threads, 406a, 406b, etc. and can access basetable 416. Text shared memory 402 preferably can be accessed by both word breaker 206 (preferably, an outside process 207) and the threads comprising threadpool 406. Keyword shared memory 404 preferably can be accessed by both word breaker 206 and the threads of threadpool 406. Threads 406a, 406b etc. generate instances of index 410, including 410a, 410b, etc. Instances 410a, 410b, etc. of index 410 are put in priority queue 408 and are merged by merge threads 414a, 414b, etc. of merge thread pool 414 to generate merged index 412. Merged index 412 may include multiple index instances 412a, 412b, etc. Merged indexes are placed into priority queue 408.

Figure 5:
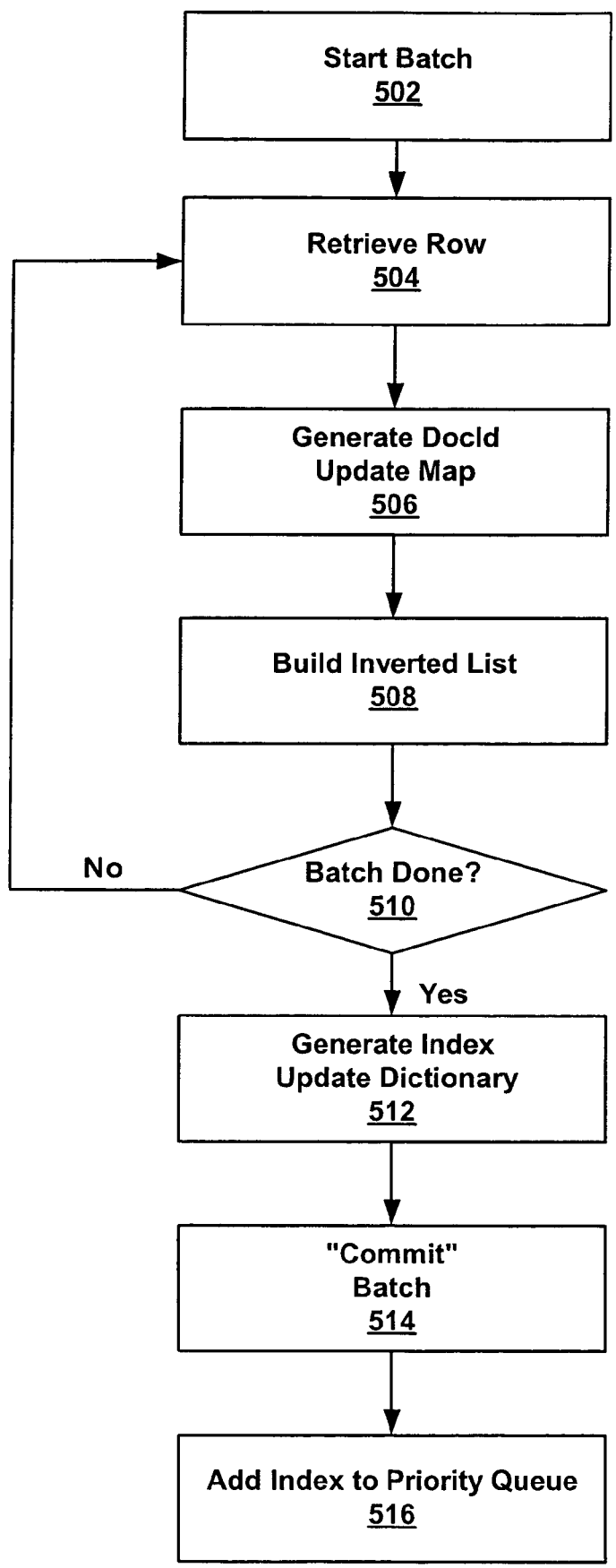
FIG. 5 is a flow diagram of a portion of a full-text search indexing method in accordance with one embodiment of the invention.

FIG. 5 is a flow diagram of a full-text search indexing method in accordance with one embodiment of the invention. Threads 406a, 406b, etc. from thread pool 406 represent separate activities and process separate batch transactions. Preferably these separate threads can be processed in parallel. FIG. 5 represents the process each thread 406a, 406b performs when it processes a batch of document rows. An instance of index 410, represented by 410a, 410b, etc. is generated by each batch as rows from basetable 416 are crawled by the separate processing threads.

At step 502, a new batch scan transaction is begun. Each batch begins with a new transaction. At step 504, a row of data is retrieved from basetable 416. A thread from thread pool 406 scans basetable 416 and stores data (i.e., text) from a row of basetable 416 in text shared memory 402. For example, thread 406a may scan row 1 of basetable 416, storing the row in chunks in shared text memory 402 at some location in the shared memory associated with thread 406a.

At step 506 a unique numeric document identifier, (referred to as DocId henceforth), is generated, which preferably translates a (sometimes) large full-text key that is not necessarily numeric in nature to a compact numerical identifier, called herein "DocId". For example, full-text key 1017 may be translated to DocId "1" and full-text key 1033 may be translated to DocId "2". A table that maps full-text keys to DocIds is maintained, preferably keyed on full-text key. As each row is crawled, the new unique DocId generated is stored as well in text shared memory 402.

Text shared memory 402 preferably can be accessed by word breaker 206. As the rows are crawled, the full-text columns stored in shared memory 402 are parsed by filters and word breakers, collectively represented by reference numeral 206 of FIG. 4. Filters typically are modules that parse formatted documents, (e.g., WORD documents or POWERPOINT documents) and emit chunks of text to be parsed by word breaker 206.

Filters (of 206) may retrieve, for example, the data contained in row 1 of basetable 416 stored in shared memory 402, and emit a text chunk. Word breaker 206 feeds on the emitted text chunks and determines which of the words in the document are keywords. For each of the words determined by word breaker 206 to be a keyword, the location(s) of that keyword in the document is determined. Word breaker 206 writes the keyword and occurrence information for each DocId to keyword shared memory 404.

At step 508, a thread (e.g., thread 406a) picks up the keyword, the DocId and the occurrences of the keyword from keyword shared memory and inserts them into an inverted list, called herein InvertedList, associated with the batch.

InvertedList preferably is a short in-memory list of keywords and keyword occurrences. An inverted list is generated for the batch of documents processed by the thread, transaction by transaction. Alternatively, more than one inverted list is generated per batch of documents.

Figure 6:
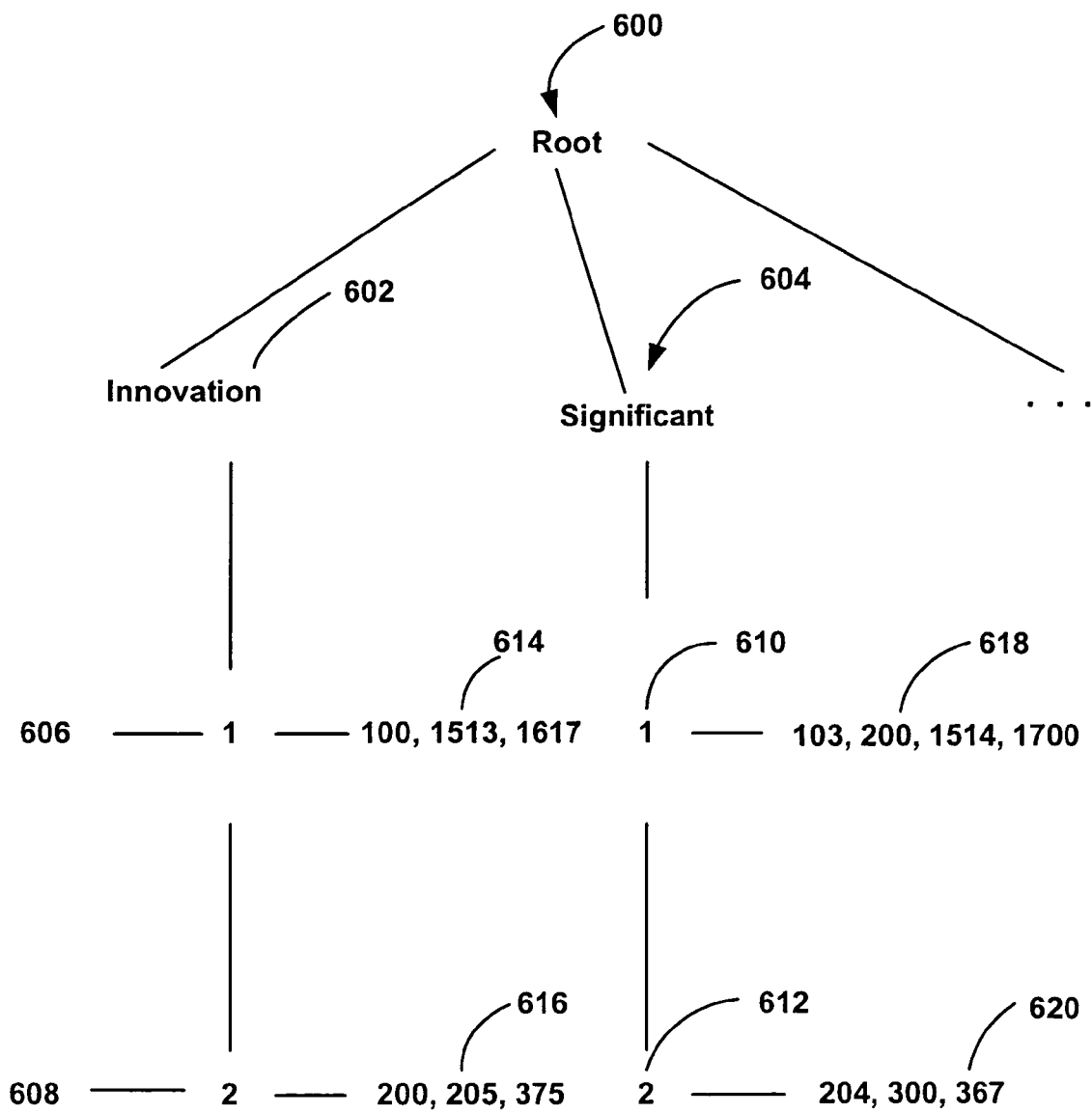
FIG. 6 is block diagram of a tree data structure implementation of one aspect of the invention, the shared memory InvertedList.

InvertedList, as illustrated by FIG. 6, is preferably implemented as an in-memory balanced tree, 600 of keywords 602, 604, etc. found in the documents processed in the batch. In one embodiment, for each keyword, a heap of DocIds 606, 608 and 610, 612 containing that keyword is maintained. For each DocId 606, 608 and 610, 612 in the heap, a sorted list of locations 614, 616 and 618, 620 (word position, preferably implemented as word offset, which is the same as the basetable 216 word location) is maintained, where the respective keyword appears in the document. This information is preferably stored in local memory (not shown) associated with thread 406a.

Figure 7:
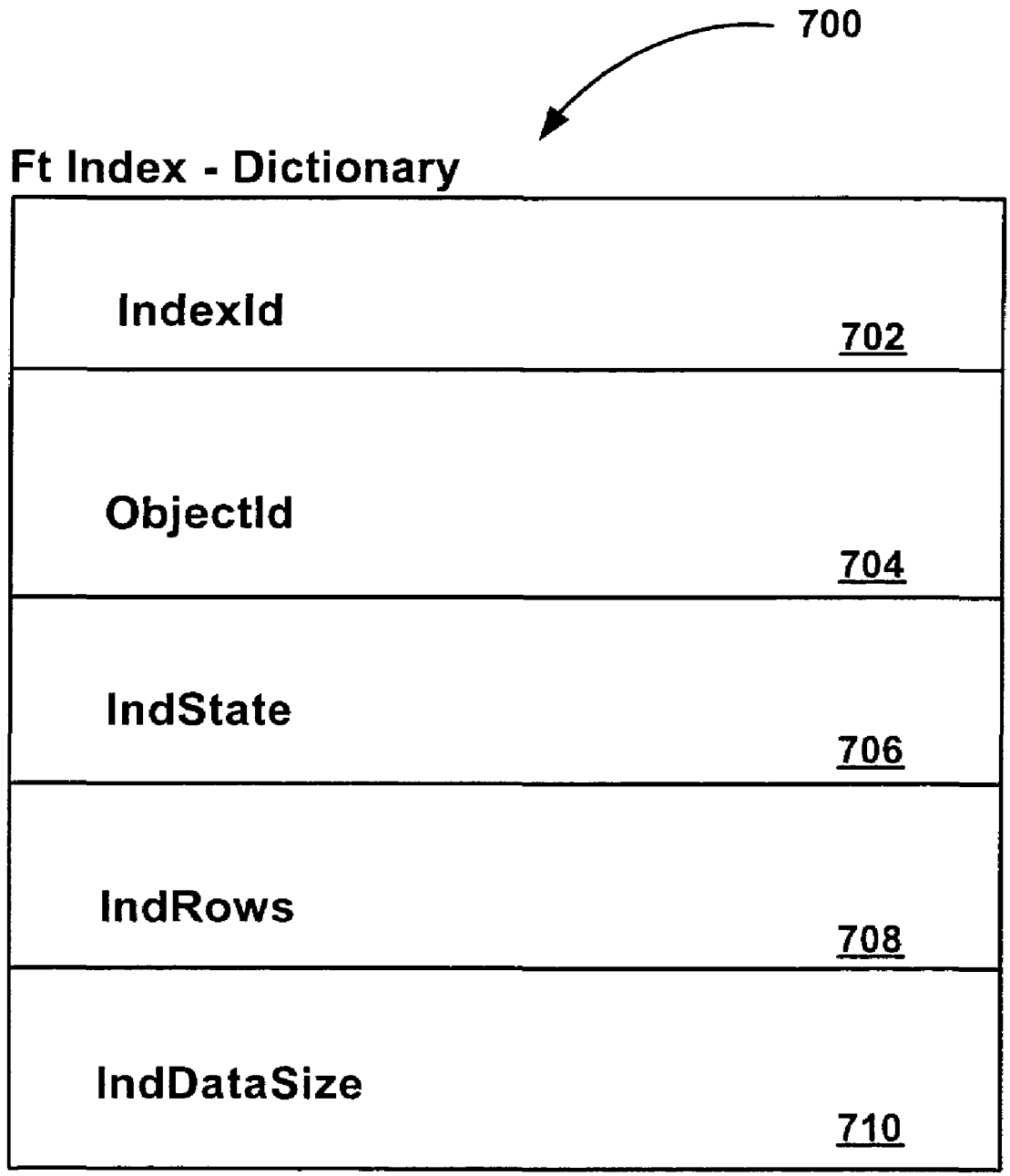
FIG. 7 is a representation of a database structure for a full text index dictionary in accordance with one embodiment of the invention.

Rows from the basetable 416 are processed until it is determined that the batch is complete (step 510). Batches may be determined to be complete when some configurable parameter representing a number of documents processed has been reached. When the batch is complete, at step 512, thread 406a creates an instance of index 410, (e.g., index 410a). Index 410 is a standard database table, (e.g., a SQL B-tree). A database table containing meta-data about instances of index 410 is also updated. In the example, the meta-data table is updated to reflect index instance 410a. This table is called herein FtIndex_Dictionary. The relevant structure of an exemplary FtIndex_Dictionary is depicted in FIG. 7, (i.e., FtIndex_Dictionary may include additional entries).

Elements of FtIndex_Dictionary 700 preferably include:

IndexId 702: a unique identifier for an instance of FtIndex,

ObjectId 704: a table identifier for the instance of FtIndex, created by the DBMS, IndState 706: a state indicator for the instance of FtIndex.

Possible values for IndState include StateNew, StateOpen, StateClosed and StateInMerge. IndState for the index instance is set to StateNew when the index object is created but is not yet used. IndState for the index instance is set to StateOpen when the index is in use but does not yet contain any committed data. IndState for the index instance is set to StateClosed when the index instance contains committed data and processing is complete. IndState for the index instance is set to StateInMerge when the index instance is being merged with other indexes.

IndRows 708: number of rows in the index (a count of keywords inserted)

IndDataSize 710: an estimate (approximate) size of the instance of the index.

After the inverted list is persisted into an instance of an index and DocIdMap has been updated for the batch of rows processed by the thread, the batch is committed (e.g., SQL commit) at step 514. The 2-part commit transaction ascertains that all locks and resources are acquired and then performs the disk writes. The commit transaction guarantees that no document in a batch is partially committed. If all locks and resources are not acquired, the database changes are entirely backed out. As soon as an instance of an index is committed the index is queryable.

Figure 8:
FIG. 8 is a representation of a database structure for a full text index data store in accordance with one embodiment of the invention.

FIG. 8 illustrates the physical schema of an instance of an index fragment (FtIndex 800) in accordance with one embodiment of the invention. Keyword 802 represents a normalized keyword from the document as determined by word breaker 206. Preferably Keyword 802 is a variable-length binary of maximum length 132 bytes. Keyword preferably is normalized for case and diacritical marks, based on a user's configuration. PropertyId 804 represents the column id of an attribute such as Title, Author, Content, etc. DocIdList 806 is a list of DocIds in which Keyword 802 appears. Preferably, the list of DocIds is compressed bit-wise as a BLOB, a Binary Large Object (i.e., a collection of binary data stored as a single entity). DocCount 808 is the number of documents containing the keyword, DocIdMin 810 is the smallest DocId stored in DocIdList 806. DocIdMax 812 is the largest DocId stored in DocIdList 806. OccListList 814 is a list of occurrence lists, one occurrence list for each DocId in DocIdList 806. OccCountList 816 is the number of occurrences in the corresponding occurrence lists for corresponding DocIds. Index fragments are indexed by a cluster index on (Keyword 802, PropertyId 804 and DocIdMin 810).

An InvertedList is persisted by inserting one or more rows for each keyword in InvertedList into a new instance of FtIndex. DocIdList 806 is generated by compressing sorted DocIds from InvertedList into a binary stream. Occurrences of the keyword from InvertedList are also compressed into a binary stream for each DocId containing the keyword. Occurrence lists of two consecutive DocIds stored in OccListList 814 are preferably separated by a sentinel in the compressed stream to delimit the end of one occurrence list from the beginning of the next occurrence list. When the InvertedList is persisted into an instance of FtIndex and FtIndex is committed, the state of that instance of FtIndex becomes StateClosed. The number of DocIdList BLOBs stored in a row in an instance of FtIndex is preferably limited by a parameter. At step 516, the instance of FtIndex is added to priority queue 408.

Merging

Periodically, instances of index 410 (e.g., FtIndex) are merged into fewer instances. Merging instances of the index improves query performance because fewer indexes have to be checked when a query is processed. Merging instances into fewer instances also optimizes the amount of storage and memory required because data repeated in index instances is eliminated (e.g., FtIndex_A and FtIndex_B may both contain the keyword "innovation" so that two rows (one in FtIndex_A and one in FtIndex_B) can be combined into one row in FtIndex_X). Finally, the number of I/O (input/output) operations is reduced because when the merged index is rewritten, related data is physically located closer together.

Figure 9:
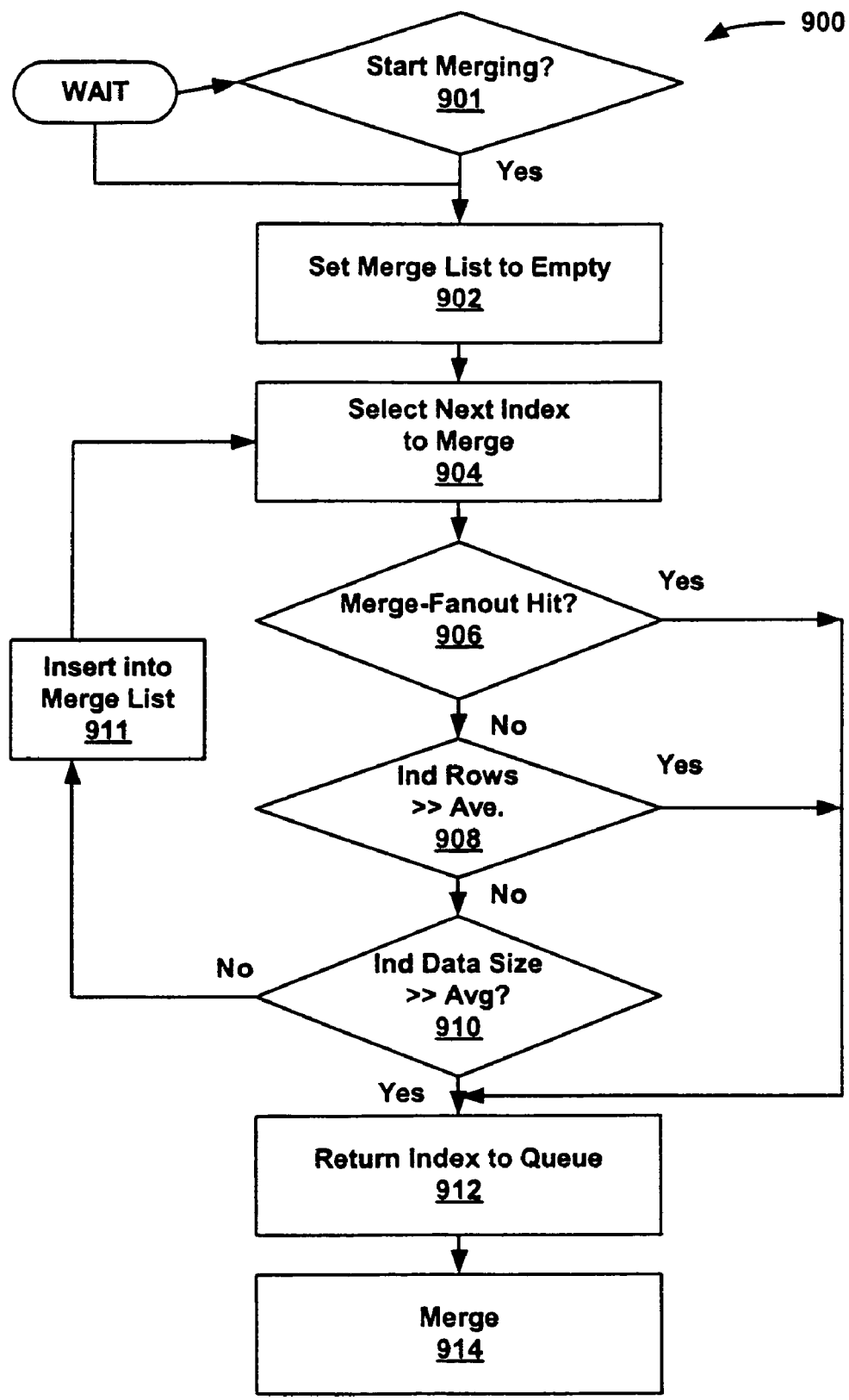
FIG. 9 is a flow diagram of a method for scheduling and selecting indexes to merge in accordance with one embodiment of the invention.

FIG. 9 illustrates a method 900 for selecting when to merge persisted indexes and also which indexes and how many indexes to select to merge. In general, it is desirable to merge as many indexes as possible in one merge so that the same data is not merged and merged again and merged again and so on, etc. On the other hand, in general, it is desirable to have as few open (unmerged) indexes as possible so that queries will have to check fewer indexes. For example, if there are 1000 indexes and a query is received, all 1000 indexes will have to be checked, necessitating a seek through each of the 1000 indexes. After a merge is performed, (perhaps all 1000 indexes have been merged into one index), typically, disk space requirements are reduced because redundant information is reduced, (the one merged index takes less space than the 1000 unmerged indexes), and the number of I/O (input/output) operations required are reduced because a fewer number of indexes exist (a seek is done on one index instead of on 1000 indexes). Typically as well, when the merged index is created, the keyword, document identification data and occurrences data are rewritten so that this information is located physically closer together, reducing access time. One embodiment of the invention balances the amount of query overhead that results from the existence of a large number of indexes with the amount of processing resources required to merge indexes. A soft configurable parameter called herein OpenIndexes determines when a desirable number of open (unmerged) indexes has been exceeded and influences when a merge is initiated. At step 901, a merge is initiated. At step 902, a list of indexes selected to merge (called herein MergeList) is initialized to "empty".

It is desirable to merge indexes of approximately the same size for efficiency considerations. The priority queue of indexes is preferably implemented as a heap data structure having the sort order: (IndRows, IndDataSize) so that the smallest index in that order is located at the top of the heap. Hence, as indexes are selected from the priority queue in step 904 for merging, indexes containing less data are selected before those containing more data. It will be appreciated that an alternative to sorting in ascending order and selecting from the top of the queue is sorting in descending order and selecting from the bottom of the queue. At step 904 an index is selected to merge. Indexes are pulled from priority queue 406 until any of the following conditions occur. It should be understood that the order of the steps 906, 908 and 910 has been selected for exemplary purposes only and in practice any ordering or combination of these steps may be implemented by the conceived invention. A counter, called herein SelectedIndexCounter, that tracks the number of indexes selected to merge, is incremented. In one embodiment of the invention, a configurable parameter referred to herein as MergeFanout determines the preferred number of indexes to be merged in one merge. At step 906, SelectedIndexCounter is compared to MergeFanout. If MergeFanout is reached or exceeded, processing continues at step 912. If MergeFanout is not reached, processing continues at step 908.

It is desirable to merge indexes of approximately the same size; however, even indexes of the same overall size may merge inefficiently. For example, FtIndex_001 and FtIndex_002 may be approximately the same size but FtIndex_001 may have a small number of keywords (rows) with a large number of associated DocIds and associated data while FtIndex_002 may have a larger number of keywords (rows) with a smaller number of documents associated therewith. Alternatively, FtIndex_001 and FtIndex_002 may have approximately the same number of unique keys (rows) but FtIndex_001 may reflect the indexing of far more documents than does FtIndex_002. Hence, steps 908 and 910 are performed. At step 908 IndRows 708 for the selected index is compared to the average number of rows in the other selected indexes. If IndRows 708 for the selected index is much greater than the average, processing continues at step 912. If not, processing continues at step 910. At step 910, IndDataSize for the last index selected is compared to the average IndDataSize of the other selected indexes. If IndDataSize for the last index selected is much greater than the average, processing continues at step 912. If IndDataSize for the last index selected is not much greater than the average, processing continues at step 911 in which the index is added to MergeList and the next index is selected from the merge queue (step 904).

Figure 10A:
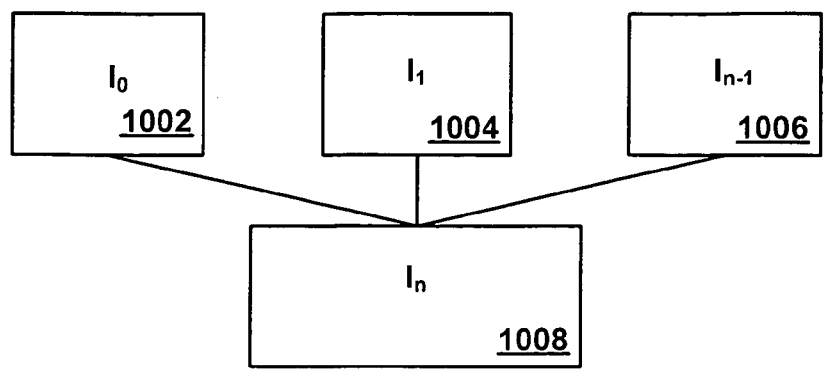
FIG. 10a is a block diagram of one type of merge in accordance with one embodiment of the invention.

At step 912, the last selected index is returned to the priority queue and processing continues at step 904. At step 914, the selected indexes (in MergeList) are merged. Merging preferably can occur in one of three ways. FIG. 10a illustrates a first merge strategy in accordance with one aspect of the invention. In MergeOutOfPlace, indexes selected from the priority queue 408 (represented by exemplary indexes $I_0$ 1002, $I_1$ 1004, ... $I_{n-1}$ 1006) are merged in the order of (Keyword, PropertyId) to form a merged DocIdList, OccListList and OccCountList and the merged rows are inserted into a new index (e.g., $I_n$ 1008). This type of merge is preferably performed when most of the rows need to be updated. MergeOutOfPlace is typically very fast because a bulk insert can be performed.

Figure 10B:
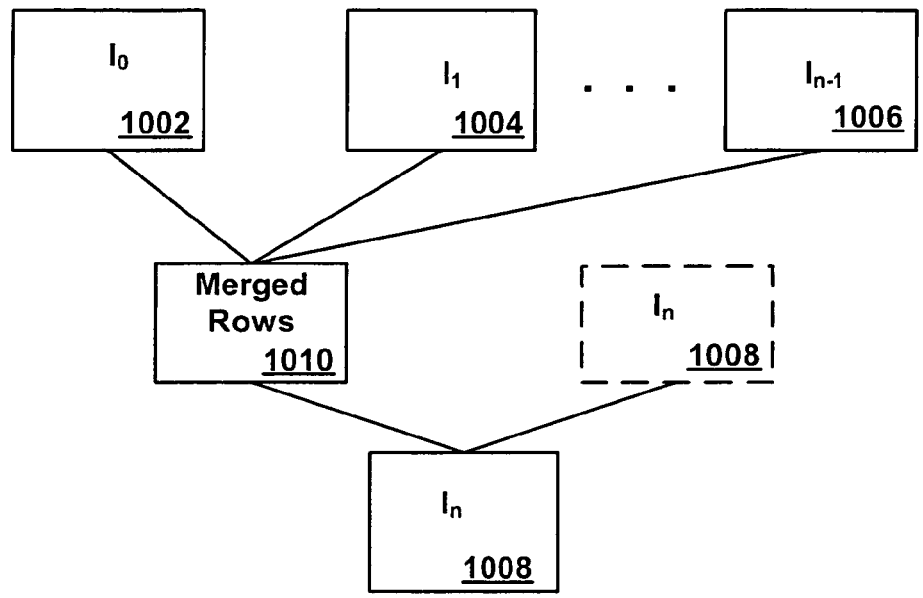
FIG. 10b is a block diagram of another type of merge in accordance with one embodiment of the invention.

FIG. 10b illustrates a second merge strategy in accordance with one aspect of the invention. In InsertMerge, rows from all indexes (e.g., $I_0$ 1002, $I_1$ 1004, ... $I_{n-1}$ 1006, $I_n$ 1008) except the last index selected ($I_n$ 1008) are merged in (Keyword, Property Id) order into MergedRows 1010 and the merged rows to form a merged DocIdList, OccListList and OccCountList and the merged rows (rows from $I_0$ 1002, $I_1$ 1004, ... $I_{n-1}$ 1006) are inserted into the last index, $I_n$ 1008. InsertMerge is preferably performed when there are few keywords that need to be inserted into the index.

Figure 10C:
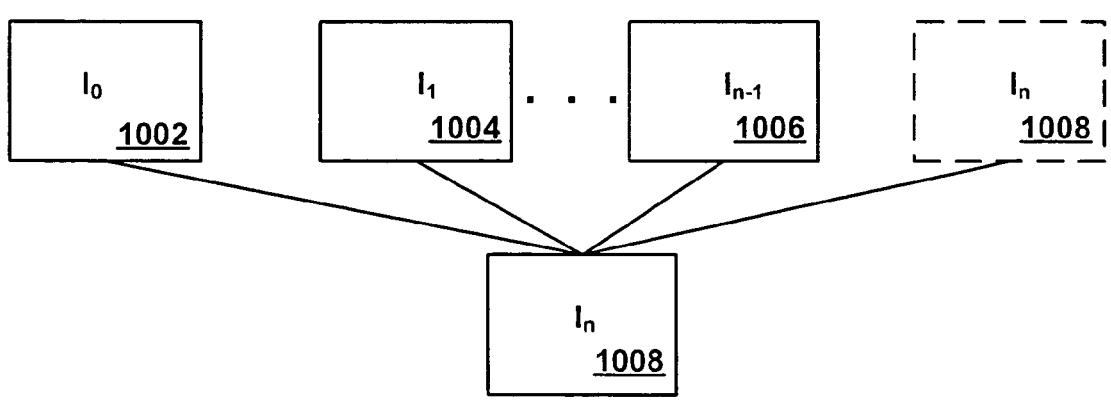
FIG. 10c is a block diagram of a third type of merge in accordance with one embodiment of the invention.

FIG. 10c illustrates a third merge strategy in accordance with one aspect of the invention. In MergeInPlace all the rows from all the indexes (i.e., $I_0$ 1002, $I_1$ 1004, ... $I_{n-1}$ 1006, $I_n$ 1008) are merged in the order of (Keyword, PropertyId) to form a merged DocIdList, OccListList and OccCountList and the merged rows are inserted back into the last index selected, (i.e., $I_n$ 1008). If a row from the last index, (i.e., $I_n$ 1008), does not need to be merged with any other row from the other indexes (i.e., $I_0$ 1002, $I_1$ 1004, ... $I_{n-1}$ 1006), then no changes are made to that row. If a merge is required with one or more rows from the other indexes, then the original rows participating in merger from the last index are deleted and the merged row is inserted. MergeInPlace is preferable when there are many keywords to be inserted but MergeOutOfPlace is not feasible because of resource (e.g. disk space) limitations.

Performant Merge System

An indexing module (e.g., thread 406a of thread pool 406) builds instances of an index and assigns a temporal indicator to the instance. Instances of the index are placed in a priority queue 408. A merging thread (e.g., 414a of merge pool 414) selects instances from priority queue 408 to merge and validates the set of selected instances. Invalid instances are returned to priority queue 408. Valid instances are merged to generate an instance of a merged index (e.g., 412a of 412). The merged index is returned to the priority queue 408.

The following database tables, illustrated in FIGS. 11, 12, 13, 15, 16 and 20 are built and maintained. Preferably the database management system utilized is SQL SERVER but use of any suitable database management system is contemplated by the invention.

Figure 11:
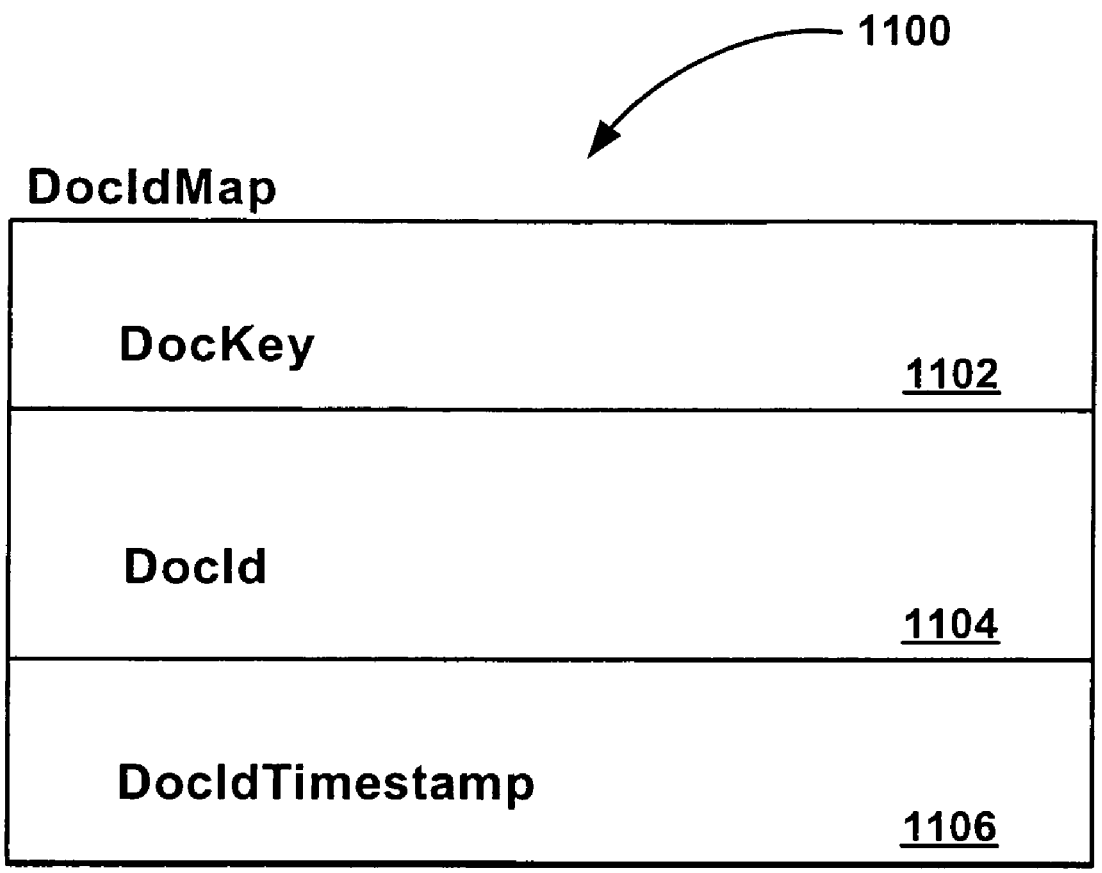
FIG. 11 is a representation of a database structure for a document identification map in accordance with one embodiment of the invention.

FIG. 11 represents a table (called herein DocIdMap) 1100 that maps a unique alphanumeric data identifier (called herein DocKey) to a smaller numeric identifier (called herein DocId). DocIdMap 1100 preferably includes DocKey 1102, DocId 1104 and DocIdTimestamp 1106. DocKey 1102 (a numeric or alphanumeric identifier, of potentially considerable size) uniquely identifies the source of the data (e.g., the source document if the data comprises a document.) For example, DocKey 1102 preferably is the full-text key in a full-text indexed basetable or a unique identifier of a file in a file system. DocId 1104 is a unique identifier generated for every crawled row in a database identified by DocKey or every crawled file in a file system. Preferably, DocId 1104 is a smaller numeric identifier that is more easily compressible than DocKey 1102. DocId 1104 is used as the data item identifier in the index. DocIdTimestamp 1106 is the timestamp of the crawl that resulted in the index, as described below. When a data item is deleted, the timestamp of the data item is set to infinity, (i.e., larger than any possible timestamp value).

Assume for the sake of clarity of discussion that a view of DocIdMap 1100 is defined for each active DocIdTimestamp T 1106, denoted as DocIdMap (T) which comprises a list of all DocIds 1104 where the DocIdTimestamp 1106 of the DocId 1104 is T. The view DocIdMap (T) includes a unique clustered index on DocId 1104. DocidMap (T) for T=infinity thus contains a list of deleted DocIds.

An indexed view Partial_DocIdMap is preferably maintained. Partial_DocIdMap includes a subset of all the DocIds in DocIdMap that got updated since the last full crawl. That is, preferably, Partial_DocIdMap includes a list of all DocIds having a DocIdTimestamp later than the DocIdTimestamp of the latest full crawl. The view Partial_DocIdMap includes a unique clustered index on DocId.

Figure 12:
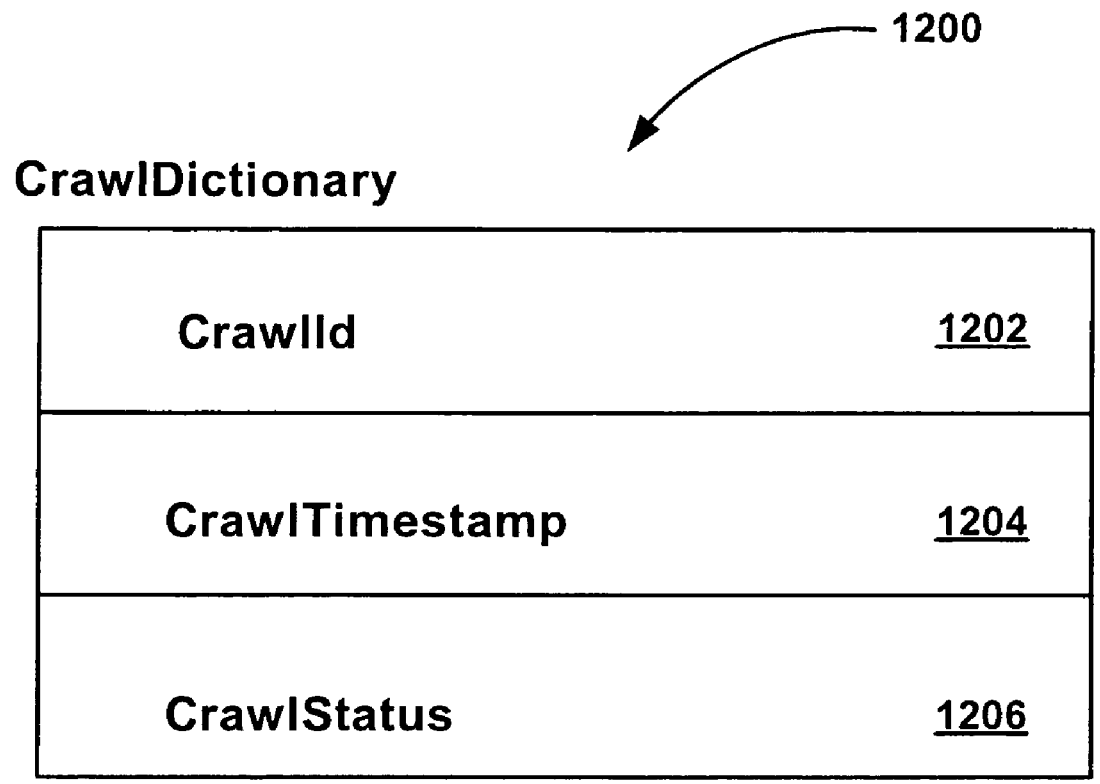
FIG. 12 is a representation of a database structure for a crawl dictionary in accordance with one embodiment of the invention.

FIG. 12 illustrates a table of crawls called CrawlDictionary 1200. CrawlDictionary 1200 comprises meta-data for the active crawls that scan the data to be indexed. CrawlDictionary 1200 includes CrawlId 1202, CrawlTimestamp 1204, and CrawlStatus 1206. CrawlId 1202 identifies the crawl, CrawlTimestamp 1204 is a numerical value that is used to track the temporal relationship of a particular crawl to other crawls within a set of crawls and CrawlStatus 1206 tracks the status of a crawl (e.g., "in progress" or "done".)

Figure 13:
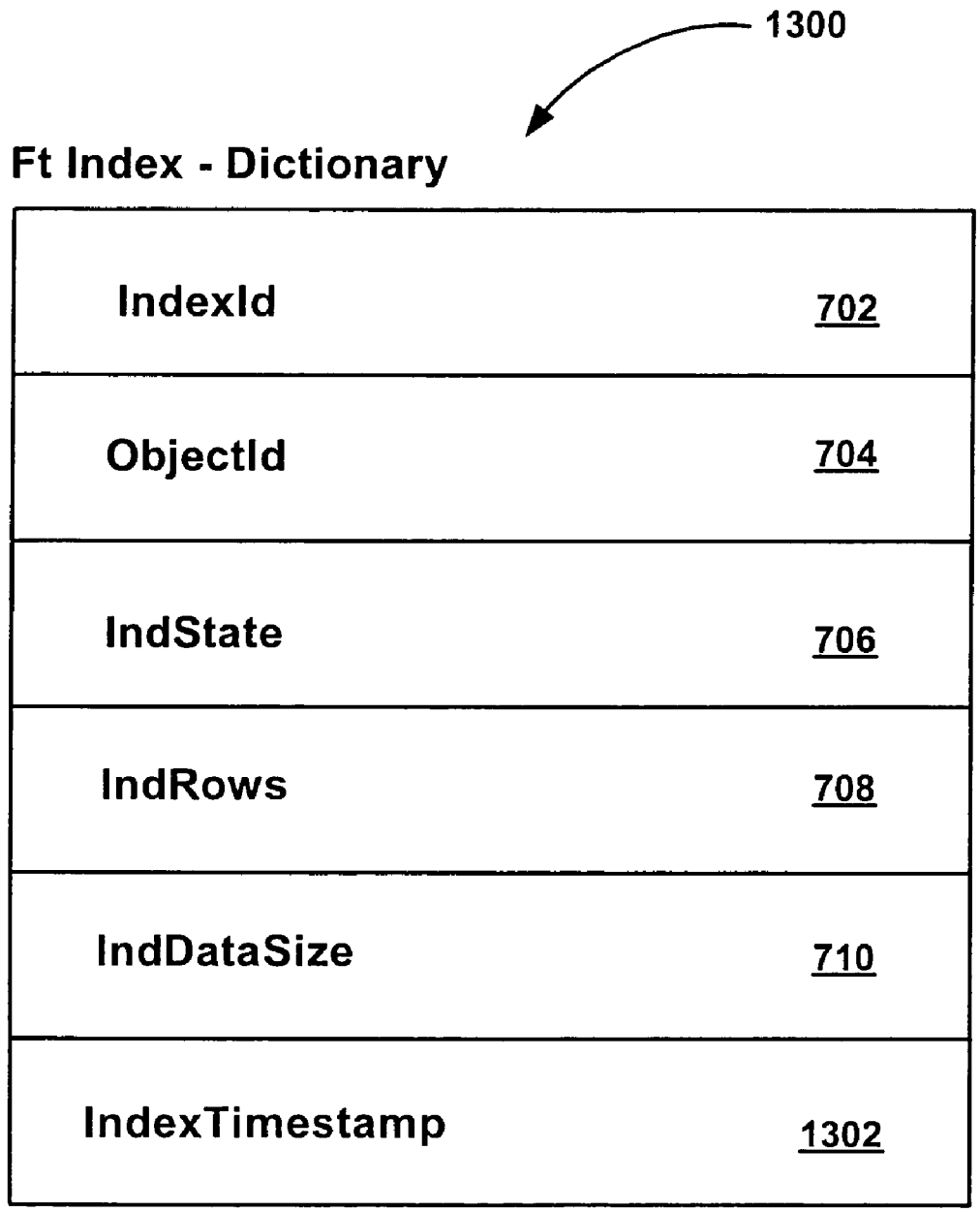
FIG. 13 is a representation of a database structure for a full text index dictionary in accordance with one embodiment of the invention.

FIG. 13 illustrates a FtIndexDictionary 1300 that comprises meta-data for the indexes built and maintained by the indexer. FtIndexDictionary 1300 includes but is not limited to IndexId 702, a unique Index identifier and Index Timestamp 1302, which indicates the temporal relationship of a particular index to other indexes within a set of indexes, as discussed below.

Performant Index and Merge Process

Figure 21:
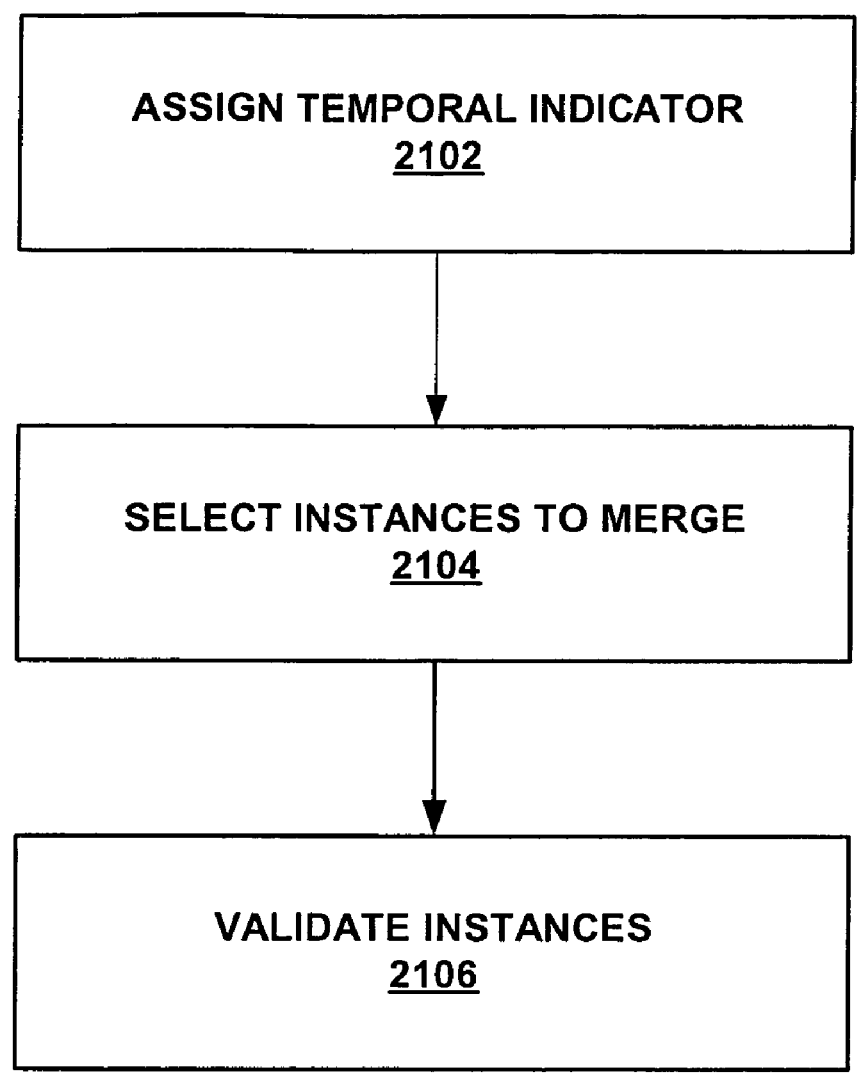
FIG. 21 is a flow diagram of an exemplary method of indexing and merging indexes in accordance with one embodiment of the invention.

FIG. 21 illustrates a flow diagram of an indexing and merge method in accordance with one embodiment of the invention. A temporal indicator is assigned to instances of an index at step 2102. At step 2104, instances are selected for merging. At step 2106, the indexes are validated and merged. A temporal indicator (timestamp) is assigned to the index when the index is created. If the index is created by an indexing thread, the index is given the timestamp of the crawl that created the index. If the index is created by a merge, the index is given a timestamp consistent with the data snapshot at that time, as discussed below.

Figure 14:
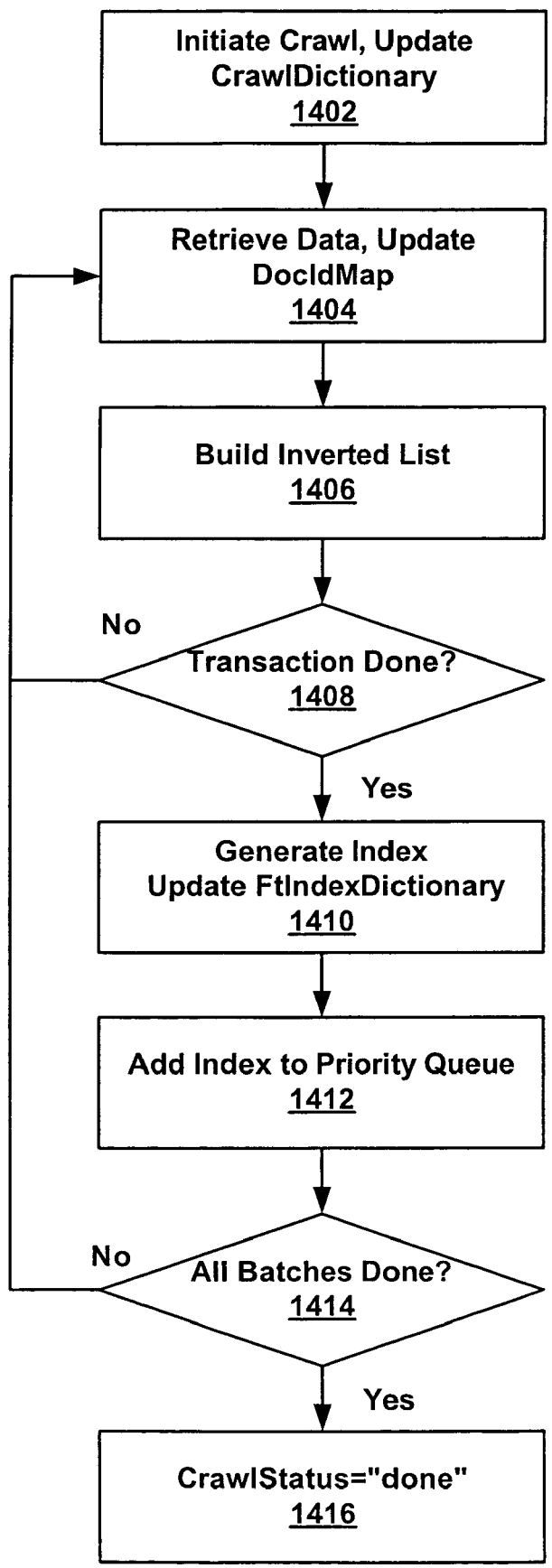
FIG. 14 is a flow diagram of an exemplary method of indexing in accordance with one embodiment of the invention.

FIG. 14 is a flow diagram of a full-text search indexing method in accordance with one embodiment of the invention. At step 1402, a crawl is initiated and CrawlStatus 1206 for the crawl is set to "in-progress". A crawl preferably includes several transactions, each transaction persisting an inverted list into stable storage. A crawl preferably can scan all the data items in a collection (referred to herein as a "full crawl") or can scan some subset of the entire data item collection (referred to herein as a "partial crawl".)

In any given crawl, data that has been indexed preferably is not re-indexed, that is, if the data being crawled is a set of documents and Crawl1 indexes Document 1, Document 1 will not be crawled again by Crawl1, although Document 1 may be crawled by a subsequent crawl.

When a crawl is initiated, a crawl identifier (CrawlId 1202) is assigned to the crawl. The crawl is also assigned a CrawlTimestamp 1204. CrawlTimestamp 1204 is a unique, ordered number so that if a second crawl is initiated after a first crawl is initiated, the second crawl will receive a CrawlTimestamp that is greater (or otherwise indicates that the crawl is happening later) than the first crawl timestamp. CrawlStatus 1206 for the crawl is set to "in-progress". An entry is made in CrawlDictionary 1200 for the crawl, persisting the values for CrawlId 1202, CrawlTimestamp 1204 and CrawlStatus 1206. Preferably, timestamps are generated by a random number generator where only increasing numbers can be generated. Periodically the number generator may be reset.

In one embodiment the timestamp is reset by allowing all the active crawls to finish, and performing a full merge of all the indexes. After the full merge is performed, only one index with one timestamp is left. The timestamp of this index is updated to a new timestamp. The timestamp of all non-deleted data identifiers are also updated to the new timestamp. The new value is a small value, e.g., 1). The timestamp counter is reset to this small value. Alternatively, any suitable method of resetting the timestamp may be performed.

Other suitable methods for generating an ordered unique timestamp are contemplated by the invention. Timestamps are preferably based on a common time reference. Timestamps preferably are assigned based on the starting time of the crawl. If there are two crawls that start at exactly the same time, preferably one crawl will still receive a timestamp that is greater than the other's timestamp.

At step 1404, data to be indexed is retrieved. The data to be indexed may be retrieved from a database (e.g., from basetable 416) or alternatively, may be retrieved from a file system. The data to be indexed is identified by a full-text key (DocKey 1102). For example, perhaps the row in basetable 416 full-text key (DocKey 1102) "1017axpa324" is retrieved. DocKey 1102 typically is a somewhat large alphanumeric identifier that may not be particularly well-suited to compression. Therefore, preferably DocKey 1102 is mapped to a smaller unique numeric document identifier, DocId 1104, (e.g., "1"). The data item identified by DocKey 1102 and DocId 1104 is associated with the Timestamp of the crawl that accessed it, so that DocIdTimestamp 1106 is set to CrawlTimestamp 1204. DocKey 1102, DocId 1104 and DocIdTimestamp 1106 are updated in DocIdMap 1100. Indexed View Partial_DocIdMap gets updated likewise. View DocIdMap (T) for the timestamp DocIdTimestamp likewise gets changed.

At step 1406 the data retrieved is indexed, (e.g., an inverted list of keywords, DocId and occurrences of keyword(s) in the data item is generated). At step 1408, if more data is to be scanned by the transaction, processing returns to step 1404. If all the data to be scanned by the transaction has been processed, step 1410 is performed. At step 1410, an instance of an index FtIndex 800 is generated. A unique identifier is generated and is associated with the index instance. The index identifier is called herein IndexId 702. The index instance is also preferably associated with an IndexTimestamp 1302 which is the same as the CrawlTimestamp 1204 of the crawl generating the index which is the same as the DocIdTimestamp 1106 of the data being indexed. Preferably the index includes a plurality of keywords and is in keyword order. Associated with each keyword preferably is a list of DocIds that include the keyword and a list of occurrences (e.g., a list of word locations at which the keyword is found in the document). FtIndexDictionary 1300 is updated for the index instance.

At step 1412 the index instance is added to a priority queue. At step 1414 if the batch is complete, the process continues at step 1416. At step 1416 CrawlStatus 1206 is set to "done". "Done" means that no additional data will be crawled with the same CrawlId 1202. Thus there will be no more data with the timestamp of CrawlTimestamp 1204 for that crawl. If the batch is not complete, new data is retrieved for indexing and a new index instance is initiated.

If a data item to be indexed has changed between crawls, in one embodiment the data item is preferably flagged for re-indexing. Alternatively, the process controlling the crawl may be notified that a particular data item must be re-indexed.

Figure 15:
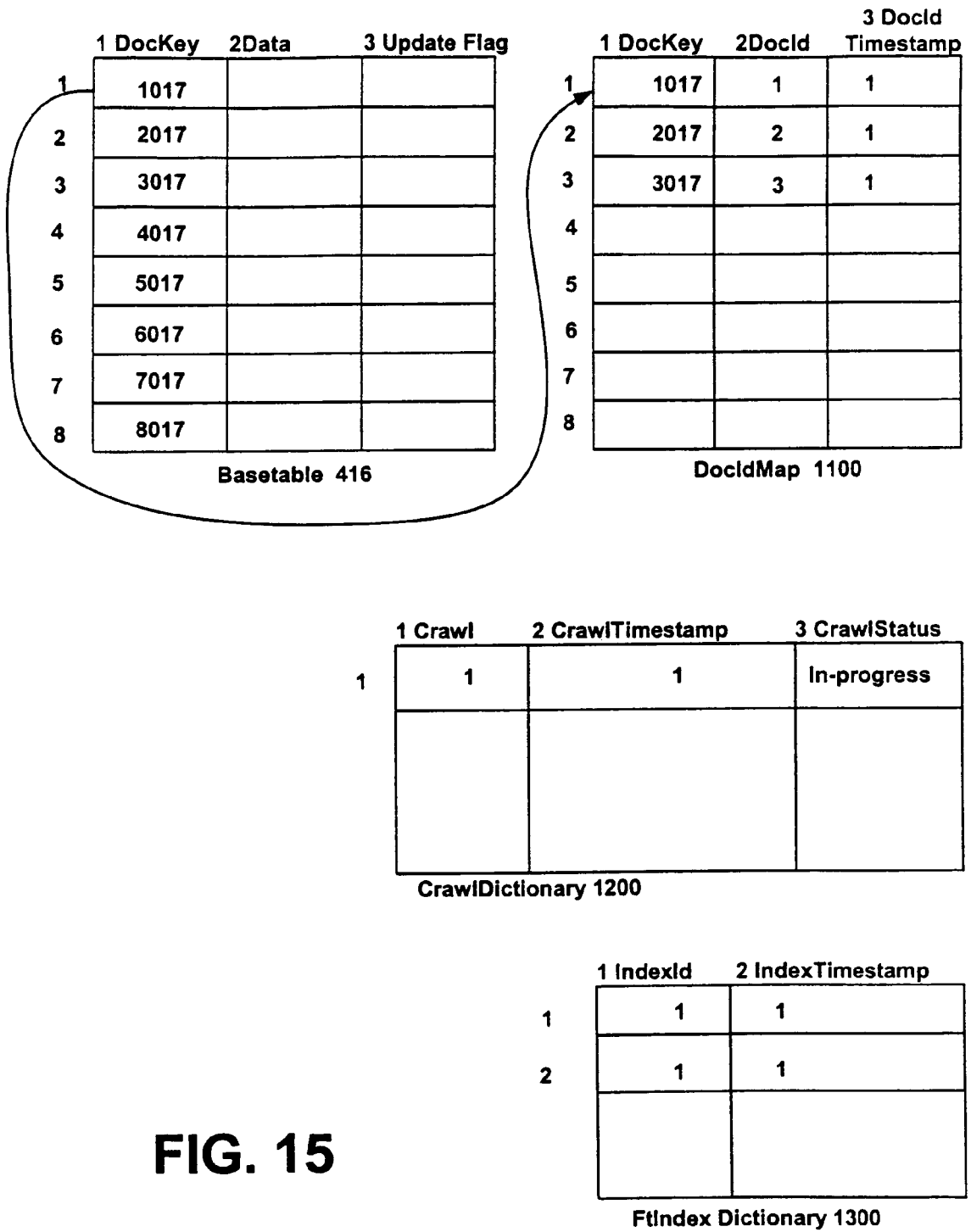
FIG. 15 is a block diagram of an exemplary indexing system in accordance with one embodiment of the invention.

Referring now concurrently to FIGS. 14 and 15, assume that CrawlID 1 associated with CrawlTimestamp 1 is initiated at step 1402. CrawlDictionary 1200 row 1, column 1 is updated with CrawlID 1, row 1, column 2 with CrawlTimestamp 1 and row 1, column 3 with CrawlStatus (i.e., "in-progress"). It should be understood that the particular rows and columns and identifying names used throughout the examples are exemplary only, and the invention contemplates any suitable table entry convention. It should also be noted that, for clarity, only IndexId 702 and IndexTimestamp 1302 are displayed in FtIndex Dictionary 1300 in FIG. 15.

At step 1404, assume that data from basetable 416, row 1, column 2 identified by DocKey 1017 of basetable 416 row 1, column 1 is retrieved. Assume that DocKey 1017 maps to DocId 1. DocIdMap 1100 row 1, column 1 is updated with DocKey 1017, row 1, column 2 is updated with DocId 1 and row 1, column 3 with DocIdTimestamp 1.

At step 1406, the data is indexed (e.g., an inverted list is generated). At step 1408, assume that the transaction is not done, so another data item, for example from basetable 416, row 2, column 2 (e.g., the data associated with DocKey 2017 of basetable 416 row 2, column 1) is retrieved. Assume DocKey 2017 maps to DocId 2. DocIdMap 1100 row 1, column 1 is updated with DocKey 2107, row 1, column 2 with DocId 2 and row 1, column 3 with DocIdTimestamp 1.

At step 1408, assume the transaction is done. At step 1410, a new index instance (e.g., IndexId=1) is generated by persisting the inverted list. IndexId 1 receives the timestamp of the crawl that generated it (i.e., 1). FtIndexDictionary 1300 row 1, column 1 is updated with IndexId 1 and row 1, column 2 with IndexTimestamp 1. At step 1412, IndexId 1 is added to the priority queue.

Assume that at step 1414 it is determined that the batch is not done. Processing returns to step 1404. At step 1404, assume that data from basetable 416 row 3, column 2, identified by DocKey 3017 of basetable 416 row 3, column 1 is retrieved. Assume that DocKey 3017 maps to DocId 3. DocIdMap 1100 row 3, column 1 is updated with DocKey 3017, row 3, column 2 with DocId 3 and row 3, column 3 with DocIdTimestamp 1. At step 1406, the data is indexed (e.g., an inverted list is generated).

At step 1408, assume that the transaction is done, so processing continues at step 1410. At step 1410, a new index instance (e.g., IndexId=2) is generated by persisting the inverted list. Row 2, column 1 of FtIndexDictionary 1300 is updated with IndexId 2 and row 2, column 2 with IndexTimestamp 1. At step 1412, IndexId 2 is added to the priority queue. Assume that at step 1414 it is determined that the batch is done. At step 1416, row 1, column 3 of CrawlDictionary 1200 is updated to "done" (FIG. 16, CrawlDictionary 1200, row 1, column 3).

Figure 16:
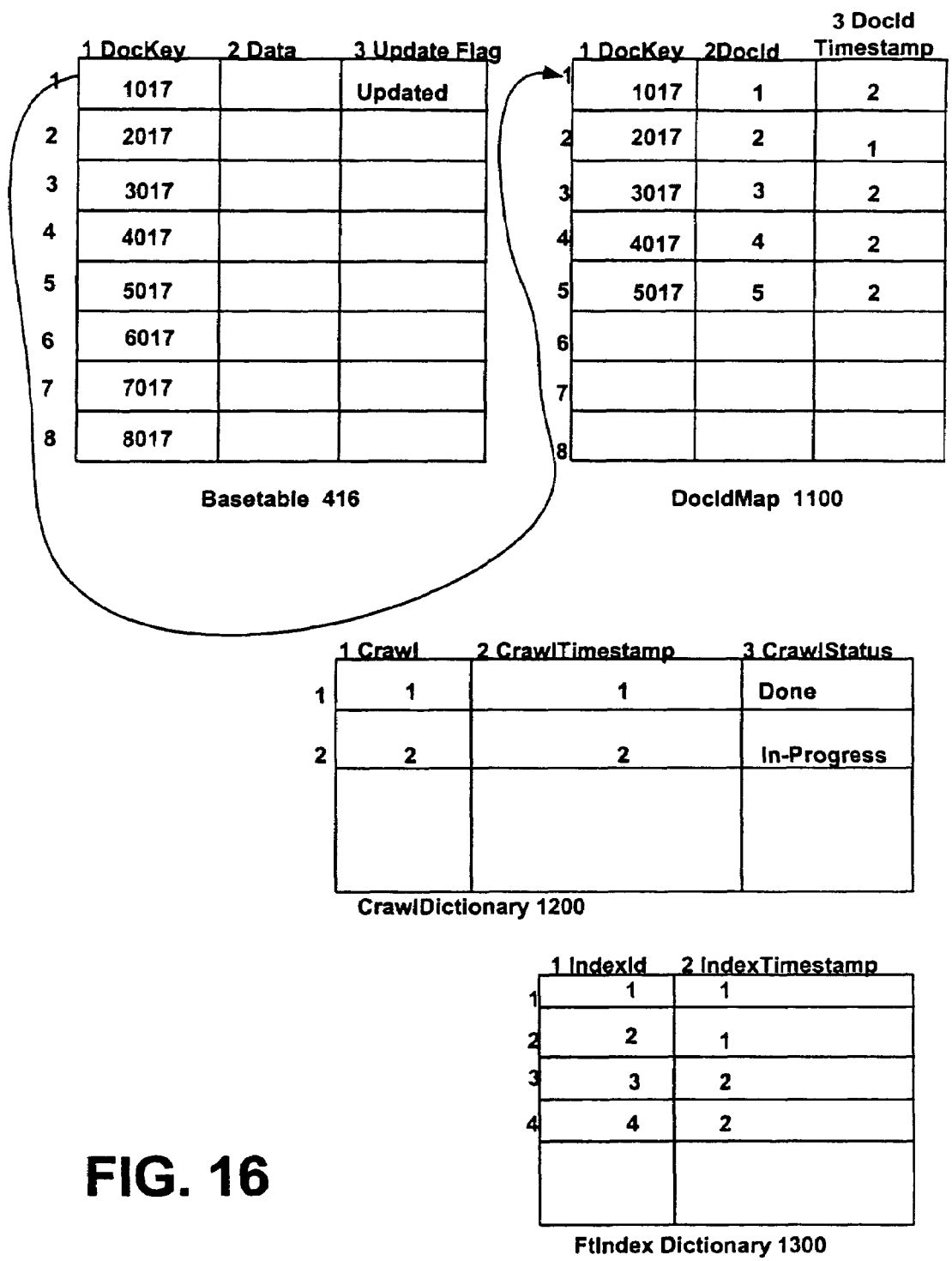
FIG. 16 is a block diagram of an exemplary indexing system in accordance with one embodiment of the invention.

Still referring to FIG. 16, assume that a second crawl is now initiated. Assume that CrawlID 2 associated with CrawlTimestamp 2 is initiated at step 1402. CrawlDictionary 1200 row 2, column 1 is updated with CrawlID 2, row 2, column 2 is updated with CrawlTimestamp 2 and row 2, column 3 with CrawlStatus (i.e., "in-progress"). Assume further that the data associated with DocKey 1017 has changed since CrawlId 1 and that DocKey 1017 has been flagged for re-indexing. For example, row 1, column 3 of basetable 416 may contain an "update" flag. Alternatively, other methods of flagging the data item or otherwise sending notification of a need for re-indexing are contemplated by the invention.

At step 1404, the updated data from basetable 416, row 1, column 2 identified by DocKey 1017 of basetable 416 row 1, column 1 is retrieved. DocKey 1017 still maps to DocId 1 but DocIdMap 1100 row 1, column 3 is updated with DocIdTimestamp 2. DocIdMap (T) will now contain an entry for DocId 1 for timestamp (T)=1, and an entry for DocId 1 for timestamp (T)=2.

At step 1406, the data is indexed (e.g., an inverted list is generated). At step 1408, assume that the transaction is not done, so another data item, for example from basetable 416, row 4, column 2 (e.g., the data associated with DocKey 4017 of basetable 416 row 4, column 1) is retrieved. Assume DocKey 4017 maps to DocId 4. DocIdMap 1100 row 4, column 1 is updated with DocKey 4107, row 4, column 2 with DocId 4 and row 4, column 3 with DocIdTimestamp 2.

At step 1408, assume the transaction is done. At step 1410, a new index instance (e.g., IndexId=3) is generated by persisting the inverted list. IndexId receives the timestamp of the crawl that generated it (i.e., 2). FtIndexDictionary 1300 row 3, column 1 is updated with IndexId 3 and row 3, column 2 with IndexTimestamp 2. At step 1412, IndexId 3 is added to the priority queue.

Assume that at step 1414 it is determined that the batch is not done. Processing returns to step 1404. At step 1404, assume that data from basetable 416 row 5, column 2, identified by DocKey 5017 of basetable 416 row 5, column 1 is retrieved. Assume that DocKey 5017 maps to DocId 5. DocidMap 1100 row 5, column 1 is updated with DocKey 5017, row 5, column 2 with DocId 5 and row 5, column 3 with DocIdTimestamp 2. At step 1406, the data is indexed (e.g., an inverted list is generated).

At step 1408, assume that the transaction is done, so processing continues at step 1410. At step 1410, a new index instance (e.g., IndexId=4) is generated by persisting the inverted list. Row 4, column 1 of FtIndexDictionary 1300 is updated with IndexId 4 and row 4, column 2 with Index- Timestamp 2. At step 1412, IndexId 4 is added to the priority queue. Assume that at step 1414 it is determined that the batch is done. At step 1416, row 2, column 3 of CrawlDictionary 1200 is updated to "done" (not shown).

Merge transactions merge a set of existing indexes into one comprehensive index. Preferably, each index has entries for keywords encountered during the crawl of data indexed in the index. The index preferably is in ascending keyword order. For each keyword, the index includes a list of DocIds for the data in which the keyword has occurred at least once. Associated with each of the DocIds preferably is a list of occurrence locations at which the keyword occurs in the data. The DocId list and the occurrence information preferably are stored in a compressed form in order to optimize storage and to minimize I/O requirements.

Indexes to be merged are selected, as described below. The merge process scans a set of indexes. The indexes preferably are in ascending keyword order. Associated with each keyword preferably is a list of DocIds (in ascending order). This DocIdList is scanned for each keyword from every index. If a DocId qualifies for the new index the DocId and its associated occurrences is placed into the new index. If the DocId and its associated occurrences does not qualify for the new index, that DocId is skipped and the next element considered.

Figure 17:
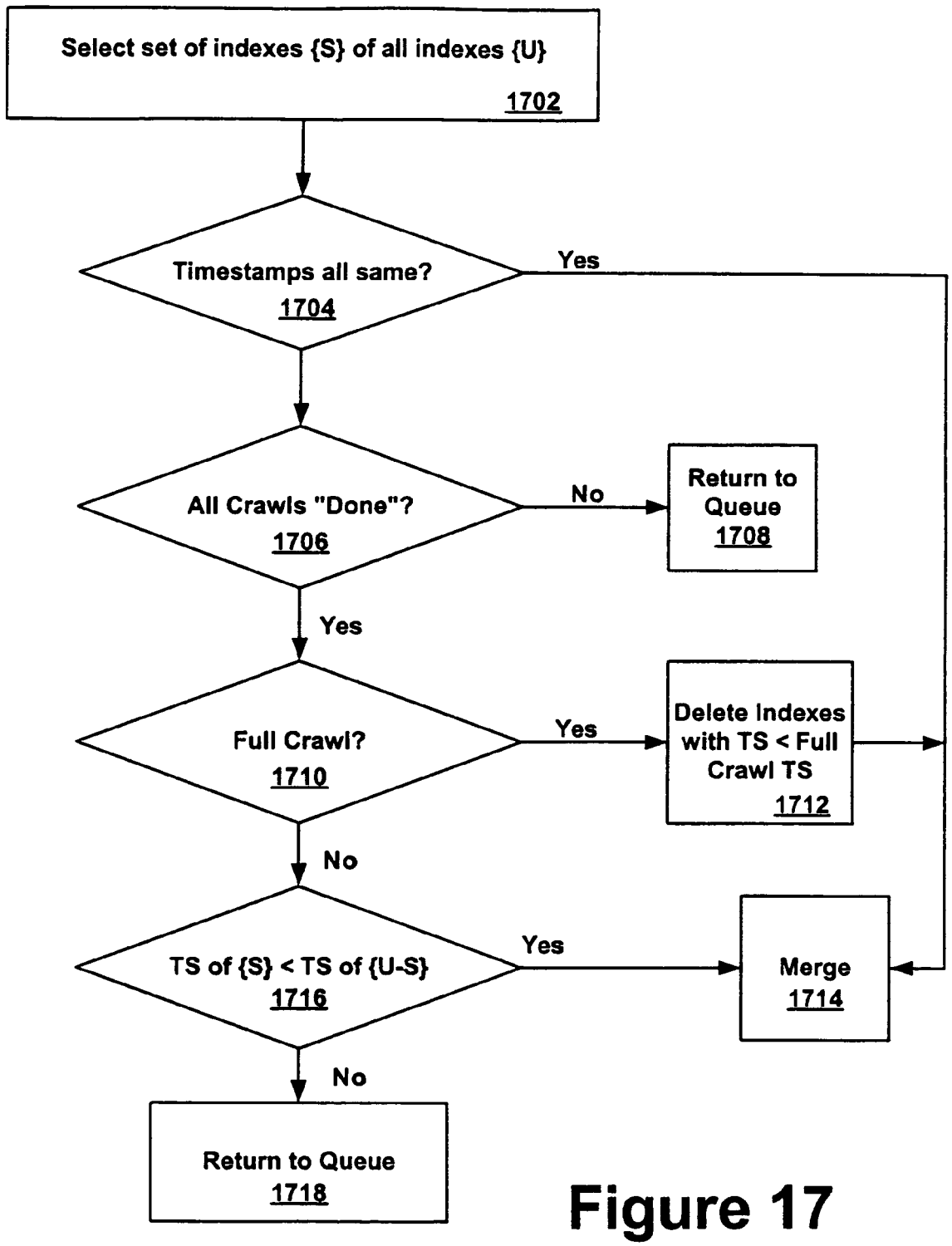
FIG. 17 is a flow diagram of an exemplary method of selecting indexes for merging in accordance with one embodiment of the invention.

FIG. 17 illustrates an exemplary index selection process 1700 in accordance with one embodiment of the invention. At step 1702, a set of indexes {S} are selected from the priority queue. At step 1704, each of the indexes in set {S} is examined to determine if all the timestamps of the indexes in {S} are the same. If all IndexTimestamp values for the selected set of indexes {S} are identical, the timestamp of the merged index is set to IndexTimestamp and processing continues at step 1714. If all the values for IndexTimestamp for the set of indexes {S} are not the same, processing continues at step 1706.

At step 1706 the CrawlStatus for the CrawlId that generated the index is examined. If each crawl associated with an index in set {S} has CrawlStatus of "Done", processing continues at step 1710. If any index is associated with a Crawl whose CrawlStatus is not "done", the index is returned to the priority queue and the next index is examined (step 1708).

At step 1710, it is determined if the set of indexes {S} includes a set of indexes representing a full crawl. If the set of indexes {S} does include a set of indexes representing a full crawl, all indexes with a timestamp less than the timestamp of the set of indexes representing a full crawl are deleted from {S} at step 1712 and processing continues at step 1714.

If the set of indexes {S} does not include a set of indexes representing a full crawl, the timestamp of each of the indexes in set {S} is compared to the set of indexes in the priority queue {U}. If an index in the priority queue is associated with a timestamp T that is identical to or greater than the timestamp of an index that exists in {U} but does not exist in {S} then the indexes with timestamp T are removed from {S} and returned to the priority queue at step 1718. If however, every index in {S} has a timestamp which is less than each index in {U} but not in {S}, processing continues at step 1714.

Referring now concurrently to FIGS. 16 and 17, assume that IndexIds 1 and 2 (rows 1 and 2 of FtIndexDictionary 1300) are selected to be merged. At step 1704, the IndexTimestamp of IndexId 1 (row 1, column 2 of FtIndexDictionary 1300) is compared to the IndexTimestamp of IndexId 2 (row 2, column 2 of FtIndexDictionary 1300). Since both timestamps are "1", this is a homogeneous merge, the merge index will receive a timestamp of 1 and processing continues at step 1714.

Assume now that IndexIds 1, 2, and 3 are selected at step 1702 to be merged. At step 1704, the IndexTimestamp of IndexId 1 (row 1, column 2 of FtIndexDictionary 1300) is compared to the IndexTimestamp of IndexId 2 (row 2, column 2 of FtIndexDictionary 1300) and the IndexTimestamp of IndexId 3 (row 3, column 2 of FtIndexDictionary 1300). Since the IndexTimestamp of IndexIds 1 and 2 are "1", but IndexTimestamp of IndexId 3 is "2", the timestamps are not all the same so processing continues at step 1706.

At step 1706, the CrawlStatus of the crawl associated with IndexTimestamp for each index in {S} is determined. Row 1 column 3 of CrawlDictionary 1200 indicates that CrawlStatus for CrawlTimestamp 1 is "Done" but CrawlStatus for CrawlTimestamp 2 is listed as "In-progress". Thus, IndexId 3 is removed from {S} and returned to the priority queue at step 1708.

Assume instead, that CrawlStatus for CrawlTimestamp 2 is also "Done". In this case, processing continues at step 1710. At step 1710, it is determined whether {S} includes a set of indexes that represents a full crawl. A full crawl, as used herein, refers to a crawl that has scanned all the data in a data set. For example, assume CrawlId 2 scanned DocKeys 1017 through 8017, in Basetable 416, generating IndexIds 2, 3 and 4. In this case, CrawlId 2 would be a full crawl. If all the indexes generated by CrawlId 2 (IndexIds 2, 3 and 4) were included in set {S}, all the indexes generated by CrawlId 1 (IndexId 1) would be deleted from the merge set {S} at step 1712. In fact, none of the indexes generated by crawls pre-dating a full crawl are required because those indexes were replaced with newer data. Thus, preferably the outdated indexes are removed from the database.

Assuming again that {S} contains IndexIds 1, 2 and 3, at step 1716 the timestamp of each of the indexes in set {S} (IndexIds 1, 2, and 3 having respective timestamps of 1, 1 and 2) is compared to the timestamp of the other indexes in the merge queue (IndexId 4 with timestamp 2). Since IndexIds 3 (with timestamp 2) does not have a timestamp less than IndexId 4 (with timestamp 2), (i.e., 2 is not less than 2), IndexId 3 is removed from {S} and returned to the priority queue at step 1718.

Assume that {S} contains IndexIds 1, 2, 3, and 4. Suppose now that a new crawl with timestamp 3 has re-indexed DocId 1, generating IndexId 5 with IndexTimestamp 3. DocId 1 thus has changed for the third time. Now there are no indexes in {U} that are not in {S} with timestamps less than or equal to timestamp 2, (i.e., the only index is {U} not in {S} is 3 and 3 is greater than 2), thus the set of indexes IndexId 1, 2, 3 and 4 is a valid set of indexes to be merged and processing continues at step 1714.

To merge indexes, the selected rows from the index rows for the smallest keyword in the set of all keywords in all the indexes is selected. For that keyword the DocId and Occurrence information from all the indexes that contain that keyword is merged. Then the next keyword in ascending order is selected to merge. When multiple rows from one or more indexes having the same keyword is merged, the DocIdList from each of the index rows is retrieved and then the set of DocIdLists in merged order of DocIds is iterated over. For each DocId, if the DocId is the most recent in the index set {S} (the DocId does not have to be the most recent according to DocIdMap), then that DocId and its associated occurrence information is inserted into the DocIdList of the merged index. Otherwise that DocId data is skipped.

Figure 19:
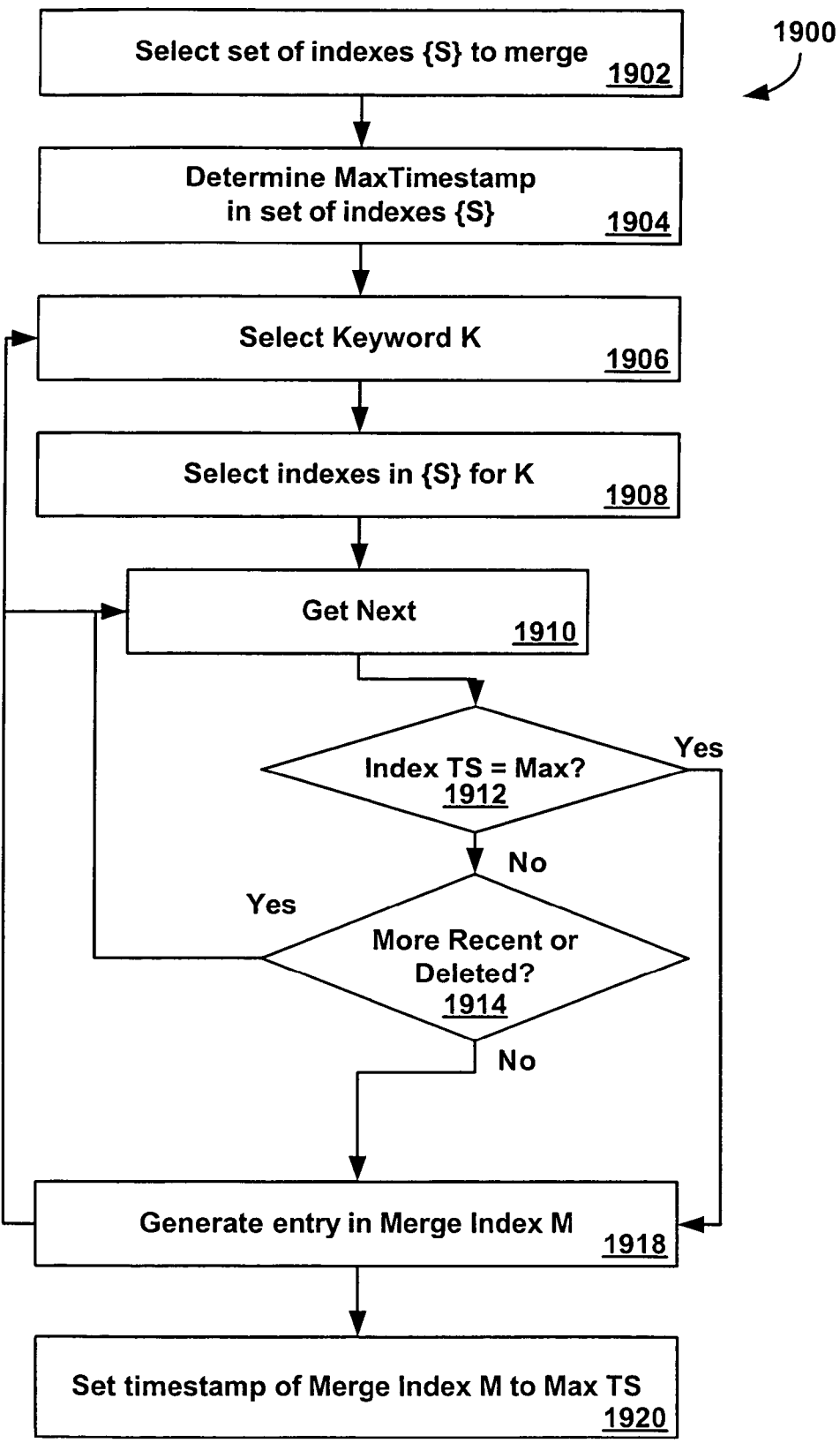
FIG. 19 is a flow diagram of an exemplary method of merging indexes in accordance with one embodiment of the invention.

FIG. 19 is a flow diagram of an index merge 1900 in accordance with one embodiment of the invention. At step 1902, the set of indexes {S} selected in the index selection process 1700 are input to the index merge process 1900. At step 1904, the largest (latest or most recent) timestamp of the set of indexes {S} is determined. At step 1906 a keyword K is selected. At step 1908 the set of indexes {S} is scanned for keyword K. At steps 1910-1918 the most recent data for the keyword K for each DocId containing the keyword K is applied to a new MergedIndex M. If the last keyword has not been processed, processing continues at step 1906 and the next keyword is selected. After all keywords have been processed, the timestamp of the merged index is set to the maximum timestamp and FtIndex Dictionary 1300 is updated with MergedIndex M (step 1920).

Figure 20:
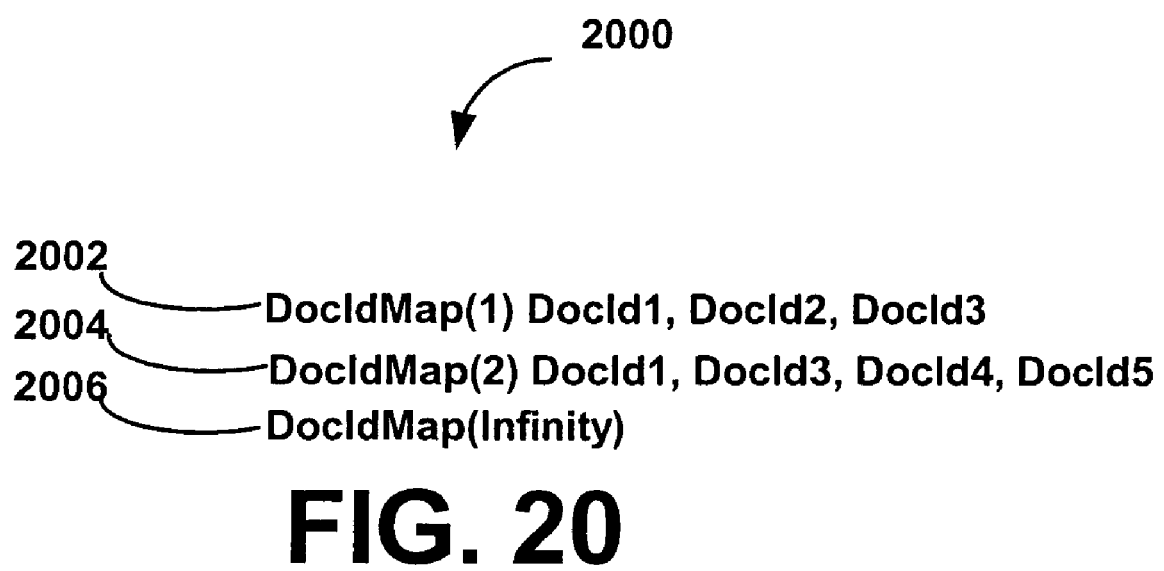
FIG. 20 is an exemplary view 2000 of the table of FIG. 11 in accordance with one embodiment of the invention.

FIG. 18 illustrates exemplary index data in accordance with one embodiment of the invention. FIG. 20 illustrates exemplary view DocIdMap (T) data in accordance with one embodiment of the invention. DocIdMap (T) 2000 includes the DocIds with timestamp 1, 2002, 2, 2004 and infinity, 2006. Referring now concurrently to FIGS. 16, 18, 19, and 20 assume that the set of selected indexes for merging {S} includes IndexIds 1, 2, 3 and 4 (step 1902). Preferably, {S} is sorted in order of descending value of timestamp so that IndexIds 3 and 4 are processed before IndexIds 1 and 2. At step 1904, IndexTimestamp, column 2 of FtIndexDictionary 1300 is scanned to determine the highest or most recent timestamp of the indexes in set {S}. The largest IndexTimestamp of IndexIds 1, 2, 3 and 4 is timestamp "2". Thus "2" is the MaxTimestamp. At step 1906, the smallest (first) keyword in the indexes of set {S} is determined. The smallest (first) keyword is "Innovation" of row 1, column 1 of IndexId 3 1806. At step 1908, IndexIds 2, 3, and 4 are scanned for keyword "Innovation". Keyword "Innovation" is also found in IndexId 1 1802 (row 1, column 1) for DocIds 1 and 2. At step 1910, DocId 1 is selected for processing. IndexTimestamp (row 3, column 2 of FtIndexDictionary 1300) for DocId 1 of IndexId 3 is determined. IndexTimestamp of IndexId 3 is "2". The timestamp of the IndexId 3 is compared to MaxTimestamp at step 1912. Because IndexId 3 IndexTimestamp and MaxTimestamp are the same (i.e, 2), IndexId 3 is the most current index in the set {S} and OccListList (IndexId3, 1806, row 1 column 3) contains the most current index information for DocId 1. Therefore, 105, 1518, 1629 will appear in MergedIndex M 1810, row 1, column 3, first list for DocId 1 (step 1918).

Next, DocId 2 is processed (step 1910). DocId 2 is present in IndexId 1 1802. "Innovation" can be found at word locations 200, 205, 375 for DocId 2 (row 1, column 3, second list). At step 1912, IndexTimestamp (row 3, column2 of FtIndexDictionary 1300) for IndexId 1 is determined. IndexTimestamp of IndexID 1 is 1 (TS=1). The timestamp of IndexId 1 (1) is compared to MaxTimestamp (2). Because IndexId 1 IndexTimestamp and MaxTimestamp are not the same, DocIdMap (T) (FIG. 20, 2000) is accessed to see if DocId 2 was recrawled between timestamp 1 (the timestamp of the IndexId 1) and timestamp 2 (MaxTimestamp) and DocIdMap (Infinity) 2006 is checked to see if DocId 2 was deleted.

At step 1914 Partial_DocIdMap 2000 is checked to see if an entry exists for DocId in DocIdMap where timestamp T is greater than the IndexTimestamp for IndexId 1 (1) and less than or equal to MaxTimestamp (2) or timestamp T=infinity. Thus DocIdMap entry 2004 is checked for the presence of DocId 2. DocId 2 is not found in DocIdMap entry 2004 because DocId 2 was not changed after CrawlId 1 created IndexId 1. Because DocId 2 was not changed between timestamp 1 and timestamp 2, IndexId 1 contains the most recent data for DocId2 and DocIdMap (2) 2004 does not contain DocId 2. Because DocId 2 was not deleted, DocIdMap (Infinity) 2006 does not contain DocId 2. IndexId 1 thus contains the most recent data in the merge set for DocId 2 and 200, 205, 375 is written to MergeIndex M at step 1918.

This process continues for all DocIds in a DocIdList for all keywords. When the last DocId for the last keyword has been processed, the timestamp of the MergeIndex M is set to Max-Timestamp and the index is persisted and placed in the priority queue.

Thus, it can be seen that in the case of homogenous merges, no table lookups are required while in the case of heterogeneous merges, the following is true:

If a data item such as a document is crawled in the latest crawl participating in a merge, then there is a lookup for that document for every keyword that is deleted from the document from the previous crawls. In this case the cost is proportional to the product of the number of distinct keywords removed from the document and logarithm of the number of documents changed (entries in Partial_DocIdMap). Once a heterogeneous merge with maximum timestamp T is performed, T can be defined as the timestamp of the last full-crawl and thus Partial_DocIdMap can be collapsed.

If a document did not get crawled then there is a lookup for every distinct keyword in that document. Cost of the lookup is proportional to the number of distinct keywords in the document and is the logarithm of the number of documents changed.

The cost of the lookup in both cases is proportional to the logarithm of the number of documents that got crawled in the latest crawl or got deleted after the previous crawl.

Thus the cost of the lookup is smallest if either the newest crawl is a full crawl (in which case, no lookups are done and the cost is 0) or most of the documents have been re-crawled in the new crawl with most of the old keywords still in the text (occurrence might have changed, and any number of new keywords may have been added) or very few documents have been re-crawled. The crawls and merges preferably can be controlled to fit the existing situation to minimize cost and maximize efficiency.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of indexing data and merging indexes within a database management system, the method comprising the following steps:

assign a first temporal indicator associated with a start time of a first crawl to a first instance of an index generated by the first crawl, wherein the first instance of the index comprises a first index of a first plurality of indexes generated by the first crawl and wherein the first plurality of indexes are database files;

assign the first instance of the index to a set of instances of the index to be merged;

assign a second temporal indicator associated with a start time of a second crawl to a second instance of an index generated by the second crawl, wherein the second instance of the index comprises a second index of a second plurality of indexes generated by the second crawl and wherein the second plurality of indexes are database files;

assign the second instance of the index to the set of instances to be merged;

store the set of instances of the index to be merged;

validate the set of instances to be merged so as to generate valid instances;

merge the valid instances to create a merged index instance; and generate an index update dictionary that includes a table comprising meta-data about the instances of the index, an identifier for the table, a state indictor including the states StateNew when an object of the index is created but is not yet used, StateOpen when the index is in use but does not yet include any committed data, StateClosed when the index instance includes committed data and processing is complete and StateInMerge when the index instance is being merged with other indexes, and an element that includes a number of rows in the index and an element that includes an estimate of a size of the instances of the index.

2. The method of claim 1, wherein the first temporal indicator is not less than the second temporal indicator.

3. The method of claim 2, wherein the set of instances to be merged is associated with the first temporal indicator.

4. The method of claim 1, wherein the start time of the first crawl is the same as the start time of the second crawl.

5. The method of claim 1, wherein the first temporal indicator associated with the first crawl is assigned to a data item scanned by the first crawl.

6. The method of claim 5, wherein an identifier of the data item and the first temporal indicator assigned to the data item are stored in an indexed database table.

7. The method of claim 6, wherein a view of the table in temporal indicator sequence is maintained.

8. The method of claim 6, wherein values of the table are compressed.

9. The method of claim 6, wherein the database table is a SQL SERVER table.

10. A system for indexing data and merging indexes within a database management system, the system comprising:

a processor;

a memory having stored thereon computer executable instructions that when executed by the processor:

assign a first temporal indicator associated with a start time of a first crawl to a first instance of an index generated by the first crawl, wherein the first instance of the index comprises a first index of a first plurality of indexes generated by the first crawl and wherein the first plurality of indexes are database files;

assign the first instance of the index to a set of instances of the index to be merged;

assign a second temporal indicator associated with a start time of a second crawl to a second instance of an index generated by the second crawl, wherein the second instance of the index comprises a second index of a second plurality of indexes generated by the second crawl and wherein the second plurality of indexes are database files;

assign the second instance of the index to the set of instances to be merged;

store the set of instances of the index to be merged;

validate the set of instances to be merged so as to generate valid instances;

merge the valid instances to create a merged index instance; and generate an index update dictionary that includes a table comprising meta-data about the instances of the index, an identifier for the table, a state indictor including the states StateNew when an object of the index is created but is not yet used, StateOpen when the index is in use but does not yet include any committed data, StateClosed when the index instance includes committed data and processing is complete and StateInMerge when the index instance is being merged with other indexes, and an element that includes a number of rows in the index and an element that includes an estimate of a size of the instances of the index.

11. The system of claim 10, wherein the first temporal indicator is not less than the second temporal indicator.

12. The system of claim 11, wherein the set of instances to be merged is associated with the first temporal indicator.

13. The system of claim 10, wherein the start time of the first crawl is the same as the start time of the second crawl.

14. The system of claim 10, wherein the first temporal indicator associated with the first crawl is assigned to a data item scanned by the first crawl.

15. The system of claim 14, wherein an identifier of the data item and the first temporal indicator assigned to the data item are stored in an indexed database table.

16. The system of claim 15, wherein a view of the table in temporal indicator sequence is maintained.

17. The system of claim 15, wherein values of the table are compressed.

18. The system of claim 15, wherein the database table is a SQL SERVER table.

19. A computer-readable storage medium including computer-executable instructions that when executed by a processor:

assign a first temporal indicator associated with a start time of a first crawl to a first instance of an index generated by the first crawl, wherein the first instance of the index comprises a first index of a first plurality of indexes generated by the first crawl and wherein the first plurality of indexes are database files;

assign the first instance of the index to a set of instances of the index to be merged;

assign a second temporal indicator associated with a staff time of a second crawl to a second instance of an index generated by the second crawl, wherein the second instance of the index comprises a second index of a second plurality of indexes generated by the second crawl and wherein the second plurality of indexes are database files;

assign the second instance of the index to the set of instances to be merged;

store the set of instances of the index to be merged;

validate the set of instances to be merged so as to generate valid instances;

merge the valid instances to create a merged index instance; and generate an index update dictionary that includes a table comprising meta-data about the instances of the index, an identifier for the table, a state indictor including the states StateNew when an object of the index is created but is not yet used, StateOpen when the index is in use but does not yet include any committed data, StateClosed when the index instance includes committed data and processing is complete and StateInMerge when the index instance is being merged with other indexes, and an element that includes a number of rows in the index and an element that includes an estimate of a size of the instances of the index.

* * * * *